(12) United States Patent
Lees et al.

(10) Patent No.: US 11,438,340 B2
(45) Date of Patent: Sep. 6, 2022

(54) SYSTEMS AND METHODS FOR SEARCHING IN IDENTITY MANAGEMENT ARTIFICIAL INTELLIGENCE SYSTEMS

(71) Applicant: SailPoint Technologies, Inc., Wilmington, DE (US)

(72) Inventors: Jon-Michael Lees, Austin, TX (US); Pamela Sharon Oren-Artzi, Austin, TX (US); Jeffrey Allen Upton, Cedar Park, TX (US); Norman Anderson, III, Austin, TX (US); Amarnath Ramakrishnan, Austin, TX (US)

(73) Assignee: SAILPOINT TECHNOLOGIES, INC., Wilmington, DE (US)

( * ) Notice: Subject to any disclaimer, the term of this patent is extended or adjusted under 35 U.S.C. 154(b) by 362 days.

(21) Appl. No.: 16/791,047

(22) Filed: Feb. 14, 2020

(65) Prior Publication Data

US 2020/0267160 A1  Aug. 20, 2020

Related U.S. Application Data

(60) Provisional application No. 62/806,495, filed on Feb. 15, 2019.

(51) Int. Cl.
*H04L 29/06* (2006.01)
*H04L 9/40* (2022.01)
*G06F 16/27* (2019.01)
*G06F 16/81* (2019.01)
*G06F 16/835* (2019.01)

(52) U.S. Cl.
CPC ............ *H04L 63/102* (2013.01); *G06F 16/27* (2019.01); *G06F 16/81* (2019.01); *G06F 16/835* (2019.01)

(58) Field of Classification Search
CPC .............................. H04L 29/06; H04G 16/835
See application file for complete search history.

(56) References Cited

U.S. PATENT DOCUMENTS

2007/0208744 A1* 9/2007 Krishnaprasad ...... H04L 63/083
707/999.009

* cited by examiner

*Primary Examiner* — Sulaiman Nooristany
(74) *Attorney, Agent, or Firm* — Sprinkle IP Law Group

(57) ABSTRACT

Systems and methods for embodiments of artificial intelligence systems for identity management are disclosed. Embodiments of the identity management systems disclosed herein may support the creation, association, searching, or visualization of any relevant context to identity management assets for a variety of purposes, including the creation of nested identity management artifacts in a search index and search syntaxes for querying such nested artifacts.

21 Claims, 5 Drawing Sheets

| | SailPoint | Home | Discover | Passwords | Request Center | Approvals | Task Manager | Certifications | Admin | | | |
|---|---|---|---|---|---|---|---|---|---|---|---|---|

| Roles | 302 | | | | | | |
|---|---|---|---|---|---|---|---|

[ ☆ Save Search ]  [ 📄 Report ]  [ ⚙ Certification ]  [ ⊗ SoD Policy ]     Query Help ⑦

Roles

3 Roles selected

| | Name | Description | Last Modified | Enabled | Access Profiles | Owner Name |
|---|---|---|---|---|---|---|
| ☑ | Accounting | Accounting Employees | 11/7/2018 | True | 2 | John.Smith |
| ☑ | Austin | Austin office employees | 11/7/2018 | True | 0 | John.Smith |
| ☑ | Engineering | Engineering employees | 10/12/2018 | True | 0 | John.Smith |
| ☐ | Executive Management | Executive Management Employees | 11/7/2018 | True | 1 | John.Smith |
| ☐ | Finance | Finance employees | 11/7/2018 | True | 0 | John.Smith |
| ☐ | Giggle Apps Users | Licensed users of Giggle Apps | 11/7/2018 | True | 1 | John.Smith |

↗ 320

1-10 of 200     Page [1] of 20 < >

FIG. 3 attributes.location:austin

FIG. 4A name:donald.hernandez

FIG. 4B

@access(source.name:*Directory* AND privileged:true) AND entitlementCount:<15

FIG. 4C

@access(source.name:*Directory* AND privileged:true) AND entitlementCount:<15

FIG. 4D attributes.firstname:kari

FIG. 4E attributes.location:london

FIG. 4F

@accounts(source.name:AD)

FIG. 4G

@accounts(source.name:AD)

FIG. 4H

SYSTEMS AND METHODS FOR SEARCHING IN IDENTITY MANAGEMENT ARTIFICIAL INTELLIGENCE SYSTEMS

RELATED APPLICATIONS

This application claims a benefit of priority under 35 U.S.C. § 119 from U.S. Provisional Patent Application No. 62/806,495 filed Feb. 15, 2019, by inventors Lees et al., entitled "SYSTEMS AND METHODS FOR SEARCHING IN IDENTITY MANAGEMENT SYSTEMS", the entire contents of which are hereby fully incorporated by reference herein for all purposes.

COPYRIGHT NOTICE

A portion of the disclosure of this patent document contains material to which a claim for copyright is made. The copyright owner has no objection to the facsimile reproduction by anyone of the patent document or the patent disclosure as it appears in the Patent and Trademark Office patent file or records but reserves all other copyright rights whatsoever.

TECHNICAL FIELD

This disclosure relates generally to computer security, including identity management in a distributed and networked computing environment. Even more specifically, this disclosure relates to enhancing computer security in a distributed networked computing environment through the use of improved searching in these identity management systems and uses of this improved searching capability for identity management functionality.

BACKGROUND

Acts of fraud, data tampering, privacy breaches, theft of intellectual property, and exposure of trade secrets have become front page news in today's business world. The security access risk posed by insiders—persons who are granted access to information assets—is growing in magnitude, with the power to damage brand reputation, lower profits, and erode market capitalization.

Identity Management (IM), also known as Identity and Access Management (IAM) or Identity Governance (IG), is, the field of computer security concerned with the enablement and enforcement of policies and measures which allow and ensure that the right individuals access the right resources at the right times and for the right reasons. It addresses the need to ensure appropriate access to resources across increasingly heterogeneous technology environments and to meet increasingly rigorous compliance requirements. Escalating security and privacy concerns are driving governance, access risk management, and compliance to the forefront of identity management. To effectively meet the requirements and desires imposed upon enterprises for identity management, these enterprises may be required to prove that they have strong and consistent controls over who has access to critical applications and data. And, in response to regulatory requirements and the growing security access risk, most enterprises have implemented some form of user access or identity governance.

Yet many companies still struggle with how to focus compliance efforts to address actual risk in what usually is a complex, distributed networked computing environment. Decisions about which access entitlements are desirable to grant a particular user are typically based on the roles that the user plays within the organization. In large organizations, granting and maintaining user access entitlements is a difficult and complex process, involving decisions regarding whether to grant entitlements to thousands of users and hundreds of different applications and databases. This complexity can be exacerbated by high employee turnover, reorganizations, and reconfigurations of the various accessible systems and resources.

Organizations that are unable to focus their identity compliance efforts on areas of greatest access risk can waste time, labor, and other resources applying compliance monitoring and controls across the board to all users and all applications. Furthermore, with no means to establish a baseline measurement of identity compliance, organizations have no way to quantify improvements over time and demonstrate that their identity controls are working and effectively reducing access risk.

Information Technology (IT) personnel of large organizations often feel that their greatest security risks stemmed from "insider threats," as opposed to external attacks. The access risks posed by insiders range from careless negligence to more serious cases of financial fraud, corporate espionage, or malicious sabotage of systems and data. Organizations that fail to proactively manage user access can face regulatory fines, litigation penalties, public relations fees, loss of customer trust, and ultimately lost revenue and lower stock valuation. To minimize the security risk posed by insiders (and outsiders), business entities and institutions alike often establish access or other governance policies that eliminate or at least reduce such access risks and implement proactive oversight and management of user access entitlements to ensure compliance with defined policies and other good practices.

One of the main goals of IM, then, is to help users identify and mitigate risks associated with access management. As IM is the discipline that ensures compliance with defined policies by aggregating, visualizing, and managing users and their access, implementations of IM systems may enable the automation of certain process within enterprises of organizations, including for example, provisioning, certifications, access reviews, and Separation of Duties (SOD) processes. Typical identity and access information available from IM solutions may utilize simple context to inform certain decision making processes, however additional, more complex and specific, context may be desirable from a variety of perspectives, including managers, owners, IT or security/regulatory departments, or others. Without such complex contextual data information management systems may suffer from low workflow efficiency and lower security.

However, even such proactive oversight may do little to ease the burden of compliance with regulatory requirements or the assessment of access requests for users in the enterprise environment. These burdens may be a microcosm of a larger issue with typical identity management systems. Namely, the sheer volume of such identity management data combined with the current manner in which identity management systems store and access such data prevents these types of identity management systems from effectively dealing with the volume of such data, which, in turn, prevents this identity management data from being effectively evaluated or even understood.

What is desired therefore, are effective ways to store, index and search such identity management data to increase the efficacy of search of identity management data at least by speeding the searching of such identity management data and improving the results and use of this searching capability.

SUMMARY

As mentioned, the sheer volume of identity management data in identity management systems combined with the current manner in which identity management systems store and access such data prevents these types of identity management systems from effectively dealing with the volume of such data, which, in turn, prevents this identity management data from being effectively evaluated or even understood.

Specifically, in most cases the identity management data is stored in typical Structured Query Language (SQL) based databases in a set of tables. Consequently, in order to search or otherwise access desired identity management data, the tables must be joined (e.g., through the use of various keys for the tables) to implement data access across tables, including any data access involved in searching this identity management data. In an identity management scenario where identity management data from hundred or even thousands of source systems is being stored and searched, the sheer volume of data and the size of the tables involved may prove prohibitive to effective implementation of search. In particular, the time scale required to perform complex searching (e.g., ad hoc queries) on such data may be on the order of hours or even days. Such time frames are unworkable in real world scenarios and may prove almost prohibitive to the searching of the identity management data or the use of searches of this data in performing identity management tasks. Moreover, because of the multiplicity and complexity of these types of tables, it can be challenging to construct queries a desired or effective query for searching across these tables.

Part and parcel with those issues, and serving to exacerbate such issues, there is currently no simple ability to design or generate effective end user driven searches of this identity management data. More specifically, there is no effective end user facing syntax for designing query strings or terms that can be effectively applied to identity management data. Accordingly, users without a high degree of knowledge regarding the content of identity management data or the schema of the various tables of the SQL store that contained the identity management data have difficulty designing or submitting appropriate search queries. Instead, a typical approach would be to utilize filters based on a single criterion or value that could be serially applied. The use of these filters offers no visibility into the interplay of the various filters with one another when applied in this manner and are confined to only a subset of the rich data and dependencies that are available in typical identity management data.

What is desired then are effective ways to store, index and search such identity management data to increase the efficacy of search of identity management data at least by speeding the searching of such identity management data and improving the results of this searching. Improved searching of identity management data may, in turn, then be usefully applied in a variety of contexts for various identity management tasks or applications to substantially improve the speed or efficacy of those tasks or applications.

Accordingly, to address these issues, among other ends, embodiments of the identity management systems disclosed herein may utilize a data model for holding identity management data in a denormalized or serialized format along with a specialized query language tailored to searching such denormalized or serialized (collectively denormalized herein) identity management data. Specifically, in certain embodiments, data on particular identity management artifacts such as an identity, entitlement, role, event, access profile, account activity or the like may be gathered by connectors within an enterprise environment and stored in a relational data store such as a SQL data store (e.g., a MySQL data store). A data pipeline may evaluate the identity management data of the relational data store to transform the identity management data into objects or documents (collectively referred to as documents herein) according to the denormalized document model for that particular identity management artifact.

In certain embodiments, these documents formed according to the data model may be nested documents whereby a document for an identity management artifact (e.g., such as an identity, role, event, etc.) may include, as a nested or child document, documents for related identity management artifacts, even in instances where documents for those related identity management artifacts may be separately stored and indexed in the NoSQL data store (e.g., as top level, root, or parent documents).

The data pipeline can then generate messages for indexing and storing these documents in a NoSQL data store (e.g., such as Elasticsearch). These indexing messages can be received (e.g., atomically or in bulk) by a search service and used to index the documents for the identity management artifacts in the NoSQL data store (e.g., using an Application Programming Interface (API), services interface or other type of interface provided by the NoSQL data store).

Embodiments of the search service may additionally provide an interface for querying the documents for the identity management artifacts stored in the NoSQL database. The interface may accept queries formulated according to a search query string syntax that allows queries to be formed whereby the nested documents of the NoSQL data store may be queried using associated nested queries. When constructing the search, the search interface may suggest query fields or a query structure to the end user. These suggestions may take into account, or be based on, the data model utilized for storing the identity management artifacts, and in particular the nested nature of the data model to suggest query structures that query these nested artifacts.

The search service can receive these queries formulated according to the search query string syntax and may evaluate the received queries to extract nested search expressions (e.g., expressions of a search query related to nested documents) and form a query expression native to the NoSQL data store (e.g., expressed in a format according to a search API offered by the NoSQL data store) representing the received query, wherein the native query expression reflects the nesting of the originally received query. It may be the case that the search service may only need to search documents of a particular type based on the query. For example, if the query specifies a nested artifact type, and only documents of a certain type have nested artifacts of the specified type, only those documents may need to be searched.

The native query expression can then be submitted to the NoSQL data store using the interface (e.g., API) of the NoSQL data store. The documents returned by the NoSQL data store in response to the submitted search can then be returned to the user or searching application and effectively utilized. In this manner, identity management artifacts can be searched based on (e.g., the content or values of) nested identity management artifacts while only accessing the document for those identity management artifacts (e.g., there may be no need to access the separately maintained documents for those nested identity management artifacts).

Embodiments thus provide numerous advantages over previously available systems and methods for managing or searching identity management data. As embodiments are based on a model of identity management data and artifacts thereof, the identity management data may be stored as nested documents in a NoSQL data store such as Elasticsearch and queried using embodiments of a specialized syntax that provide the ability to query such nested documents. The ability to store and query identity management data represented in this fashion may allow more intuitive access to such identity management data and may yield deeper and more relevant insights into such data for users of identity management systems as an outgrowth of the accuracy and granularity or precision of the queries allowed, and the results produced, by embodiments as disclosed.

Moreover, embodiments as disclosed may offer the technological improvement of reducing the computational burden and memory requirements of systems implementing these embodiments through the improved data structures, query language and query formulation implemented by such embodiments. Accordingly, embodiments may improve the performance and responsiveness of identity management systems that utilize such embodiments of these types of data models and searches by reducing the computation time and processor cycles required to implement such searches (e.g., and thus improving processing speed) and simultaneously reducing memory usage or other memory requirements. Additionally, embodiments may offer dynamic data models that enable flexible search in an end user oriented fashion.

In some embodiments, an identity management system includes a sync pipeline for obtaining identity management data associated with one or more source systems in a distributed enterprise computing environment, the identity management data comprising data on a set of identity management artifacts utilized in identity management in the distributed enterprise computing environment, wherein the identity management artifacts include a first identity management artifact of a first type and a second identity management artifact of a second type. The sync pipeline can determine that the first identity management artifact of the first type is associated with the second identity management artifact of the second type and communicate with a search service to index the identity management artifacts in the search index, including to index the first identity management artifact as a first document in the search index, to index the second identity management artifact as a second document in the search index, and to index the second identity management artifact as a nested document of the first identity management artifact.

According to embodiments, the search service maintains a search index for the identity management artifacts, the search index comprising a document for each of the identity management artifacts. The search index can communicate with the sync pipeline to index the first identity management artifact as the first document in the search index by creating the first document in the search index, to index the second identity management artifact as the second document in the search index by creating the second document in the search index and to index the second identity management artifact as a nested document of the first identity management artifact by including the second document for the second identity management artifact in the first document for the first identity management artifact in the search index while separately maintaining the second document for the second identity management artifact in the search index. These (e.g., first and second) indexed documents may thus be nested documents whereby a document for an identity management artifact (e.g., such as an identity, role, event, etc.) may include, as a nested or child document, documents for related identity management artifacts, even in instances where documents for those related identity management artifacts may be separately stored and indexed (e.g., as top level, root, or parent documents). In this manner the search service can search the first identity management artifact in the search index based on the second identity management artifact by accessing the first identity management document for the first identity management artifact.

In one embodiment, the search service is adapted to search receive a query in a query syntax that includes a nested query identifier specifying that a second type of the second identity management artifact is the nested document. The first identity management artifacts can be of a first type and the search service may only search documents for the first type of identity management artifacts based on the specification that the second type of the second identity manager artifact is the nested document.

In particular embodiments, the search index converts the query in the query syntax including the nested query identifier to a native query syntax of the search index.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE FIGURES

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIG. 3 is a depiction of an example of an interface that may be used by embodiments of an identity management system.

FIGS. 4A-4H are depictions of examples of search queries according to an embodiment of a search syntax.

DETAILED DESCRIPTION

Figure 1:
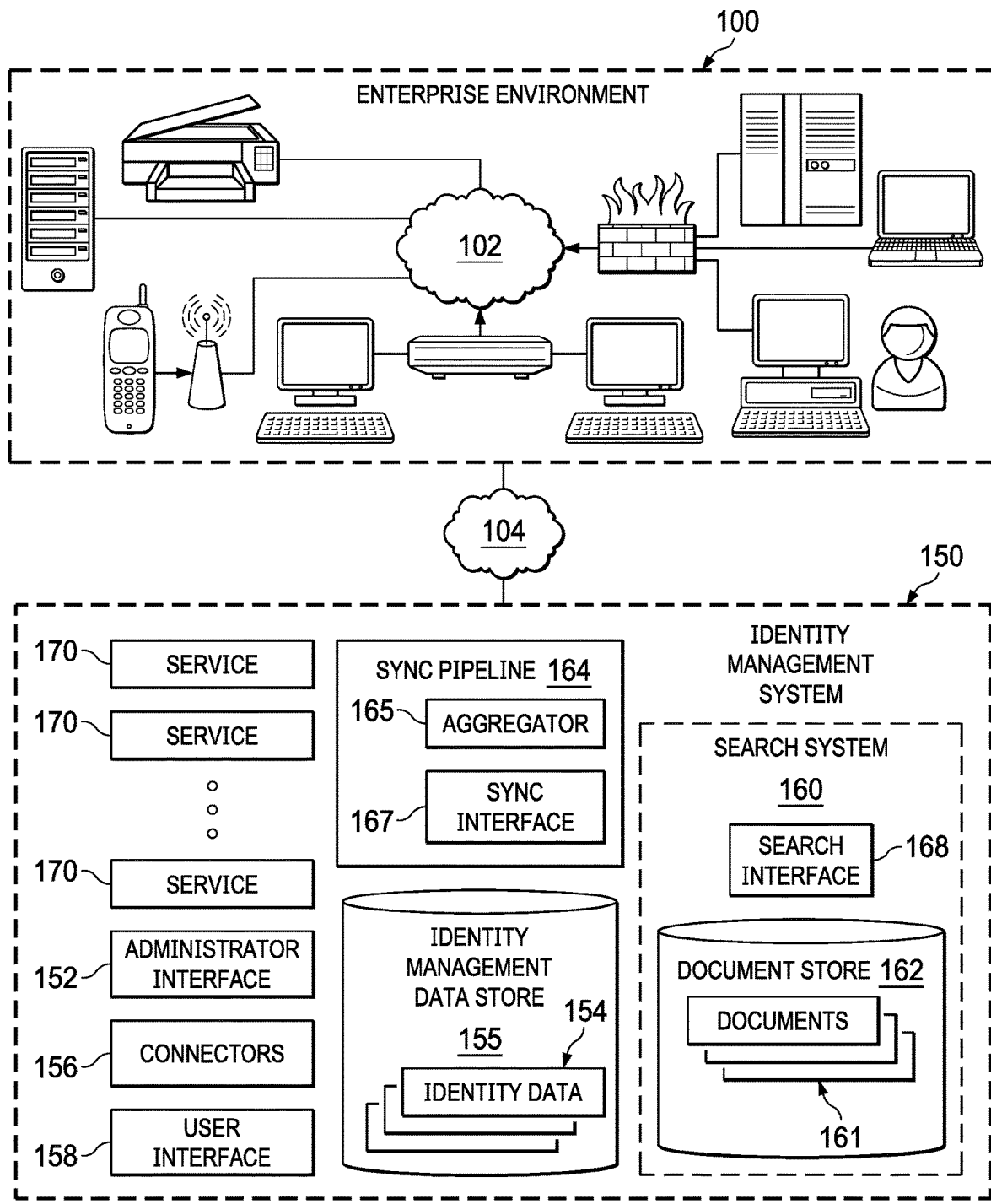
FIG. 1 is a block diagram of a distributed networked computer environment including one embodiment of an identity management system.

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Before delving into more detail regarding the specific embodiments disclosed herein, some context may be helpful. In response to regulatory requirements and security access risks and concerns, most enterprises have implemented some form of computer security or access controls. To assist in implementing security measures and access controls in an enterprise environment, many of these enterprises have implemented Identity Management in association with their distributed networked computer environments. Identity Management solutions allow the definition of particular identity management artifacts (including but not limited to, an identity, entitlement, application, account, role, event, policy, group, permission, user, owner, source, configuration, organization, violation, governance group, access profile or account activity) such that these artifacts may be associated and managed accordingly. For example, an identity may be almost physical or virtual thing, place, person or other item that an enterprise would like to define. Identities can therefore be, for example, certain capacities (e.g., manager, engineer, team leader, etc.), titles (e.g., Chief Technology Officer), groups (development, testing, accounting, etc.), processes (e.g., nightly back-up process), physical locations (e.g., cafeteria, conference room), individual users or humans (e.g., John Locke) or almost any other physical or virtual thing, place, person or other item.

To continue with these example of how these identity governance artifacts may be used, each of these identities may therefore be assigned zero or more entitlements with respect to the distributed networked computer environments. An entitlement may be the ability to perform or access a function within the distributed networked computer environments, including, for example, accessing computing systems, applications, file systems, particular data or data items, networks, subnetworks or network locations, etc. To facilitate the assignment of these entitlements, enterprises may also be provided with the ability to define roles or other identity management artifacts within the context of their Identity Management solution. A role within the context of Identity Management may be a collection of entitlements. These roles may be assigned a name or identifiers (e.g., manager, engineer, team leader) by an enterprise that designate the type of user or identity that should be assigned such a role. By assigning a role to an identity in the Identity Management context, the identity may be assigned the corresponding collection of entitlements associated with the assigned role. Accordingly, by defining these roles enterprises may define a "gold standard" of what they desire their identity governance to look like.

Thus, by managing the identity management artifacts using an identity management system, identity governance may be facilitated. For example, by managing the artifacts (e.g., identity or identities, roles, entitlements, etc.) to which users within the enterprise computing environment are assigned, the entitlements or roles to which a user may be assigned (e.g., the functions or access which a user may be allowed) may be controlled. Furthermore, by defining other identity management artifacts, such as more granular access permissions, identity management events or activity may also be determined and evaluated to assess security risk or compliance with identity management policies or rules.

One of the main goals of IM, then, is to help users identify and mitigate risks associated with access management. As IM is the discipline that ensures compliance with defined policies by aggregating, visualizing, and managing users and their access, implementations of IM systems may enable the automation of certain process within enterprises of organizations, including for example, provisioning, certifications, access reviews, and SOD processes. Typical identity and access information available from IM solutions may utilize simple context to inform certain decision making processes, however additional, more complex and specific, context may be desirable from a variety of perspectives, including managers, owners, IT or security/regulatory departments, or others. Without such complex contextual data information management systems may suffer from low workflow efficiency and lower security.

It is therefore desirable to effectively store, index and search such identity management data to increase the efficacy of search of identity management data at least by speeding the searching of such identity management data and improving the results of this searching. Improved searching of identity management data may, in turn, then be usefully applied in a variety of contexts for various identity management tasks or applications to substantially improve the speed or efficacy of those tasks or applications.

Accordingly, embodiments of the identity management systems disclosed herein may utilize a data model for holding identity management data in a denormalized format along with a specialized query language tailored to searching such denormalized identity management data. Specifically, in certain embodiments, data on particular identity management artifacts such as an identity, entitlement, role, event, access profile, account activity or the like may be gathered by connectors within an enterprise environment. A data pipeline may evaluate the identity management data of the relational data store to transform the identity management data into documents according to the denormalized document model for that particular identity management artifact. These documents formed according to the data model may be nested documents whereby a document for an identity management artifact (e.g., such as an identity, role, event, etc.) may include, as a nested or child document, documents for related identity management artifacts, even in instances where documents for those related identity management artifacts may be separately stored and indexed in the same (or a different) data store (e.g., as top level, root, or parent documents). These document can then be indexed and stored in a NoSQL data store (e.g., such as Elasticsearch).

Embodiments of the search service may additionally provide an interface for querying the documents for the identity management artifacts stored in the NoSQL data store. The interface may accept queries formulated according to a search query string syntax (e.g., from a user or another application) that allows queries to be formed whereby the nested documents of the NoSQL data store may be queried using associated nested queries. When constructing the search, the search interface may suggest query fields or a query structure to the end user. These suggestions may take into account, or be based on, the data model utilized for storing the identity management artifacts, and in particular the nested nature of the data model to suggest query structures that query these nested artifacts.

The search service can receive these queries formulated according to the search query string syntax and may evaluate the received queries to extract nested search expressions (e.g., expressions of a search query related to nested documents) and form a query expression native to the NoSQL data store (e.g., expressed in a format according to a search API or service offered by the NoSQL data store) representing the received query, wherein the native query expression reflects the nesting of the originally received query. It may be the case that the search service may only need to search documents of a particular type based on the query. For example, if the query specifies a nested artifact type, and only documents of a certain type have nested artifacts of the specified type, only those documents may need to be searched. The native query expression can then be submitted to the NoSQL data store using the interface (e.g., API) of the NoSQL data store. The documents returned by the NoSQL data store in response to the submitted search can then be returned to the user or requesting application.

Turning then to FIG. 1, then, a distributed networked computer environment including one embodiment of such an identity management system is depicted. Here, the networked computer environment may include an enterprise computing environment 100. Enterprise environment 100 includes a number of computing devices or applications that may be coupled over a computer network 102 or combination of computer networks, such as the Internet, an intranet, an internet, a Wide Area Network (WAN), a Local Area Network (LAN), a cellular network, a wireless or wired network, or another type of network. Enterprise environment 100 may thus include a number of resources, various resource groups and users associated with an enterprise (for purposes of this disclosure any for profit or non-profit entity or organization). Users may have various roles, job functions, responsibilities, etc. to perform within various processes or tasks associated with enterprise environment 100. Users can include employees, supervisors, managers, IT personnel, vendors, suppliers, customers, robotic or application based users, etc. associated with enterprise 100.

Users may access resources of the enterprise environment 100 to perform functions associated with their jobs, obtain information about enterprise 100 and its products, services, and resources, enter or manipulate information regarding the same, monitor activity in enterprise 100, order supplies and services for enterprise 100, manage inventory, generate financial analyses and reports, or generally to perform any task, activity or process related to the enterprise 100. Thus, to accomplish their responsibilities, users may have entitlements to access resources of the enterprise environment 100. These entitlements may give rise to risk of negligent or malicious use of resources.

Specifically, to accomplish different functions, different users may have differing access entitlements to differing resources. Some access entitlements may allow particular users to obtain, enter, manipulate, etc. information in resources which may be relatively innocuous. Some access entitlements may allow particular users to manipulate information in resources of the enterprise 100 which might be relatively sensitive. Some sensitive information can include human resource files, financial records, marketing plans, intellectual property files, etc. Access to sensitive information can allow negligent or malicious activities to harm the enterprise itself. Access risks can thus result from a user having entitlements with which the user can access resources that the particular user should not have access to; gain access to another user's entitlements or for other reasons. Access risks can also arise from roles in enterprise environment 100 which may shift, change, evolve, etc. leaving entitlements non optimally distributed among various users.

To assist in managing the artifacts (e.g., identity, entitlement, roles, etc.) assigned to various users and more generally in managing and assessing access risks in enterprise environment 100, an identity management system 150 may be employed. Such an identity management system 150 may allow an administrative or other type of user to define one or more identity management artifacts such as an identity, entitlement, role, event, access profile or account activity, and associate these defined identity management artifacts using, for example, an administrator interface 152. For example, defined identities may be associated with entitlements or roles. The assignment may occur, for example, by directly assigning an entitlement to an identity, or by assigning a role to an identity whereby the collection of entitlements comprising the role are thus associated with the identity. Examples of such identity management systems are Sailpoint's IdentityIQ and IdentityNow products. Note here, that while the identity management system 150 has been depicted in the diagram as separate and distinct from the enterprise environment 100 and coupled to enterprise environment 100 over a computer network 104 (which may the same as, or different than, network 102), it will be realized that such an identity management system 150 may be deployed as part of the enterprise environment 100, remotely from the enterprise environment, as a cloud based application or set of services, or in another configuration.

It may be helpful to illustrate some examples of identity management artifacts and their usage. As one example, an identity may thus be almost physical or virtual thing, place, person or other item that an enterprise would like to define. Thus, an identity may be an individual or group of users or humans, employees, a virtual entity like a sensor or a robot, an account and may include capacity, title, groups, processes, physical locations, or almost any other physical or virtual thing, place, person or other item. In one embodiment, an Identity may be an authoritative account that includes a first name, a last name and an email address. As another example, an entitlement may be the ability to perform or access a function within the distributed networked enterprise computer environment 100, including, for example, accessing computing systems, applications, file systems, physical locations, particular data or data items, networks, subnetworks or network locations, etc. Entitlements may also define the actions a user can take with respect to that access. Each of these identities may therefore be assigned zero or more entitlements with respect to the distributed networked computer environments.

Another example of an identity management artifact may be a role. Roles may be used to facilitate the assignment of these entitlements. Thus, enterprises may also be provided with the ability to define roles through the identity management system 150. A role within the context of the identity management system 150 may be a collection of entitlements, or access profiles, that may span different source systems. These roles may be assigned a name or identifiers (e.g., manager, engineer, team leader) by an enterprise that designate the type of user or identity that should be assigned such a role. By assigning a role to an identity or group of identities using the identity management system 150, the identity may be assigned the corresponding collection of entitlements or access items associated with the assigned role. Similarly, enterprises may also be provided with the ability to define access profiles. An access profile may be a set of entitlements that represent a level of logical access (e.g., user, guest, administrator, etc.) to a source or applications.

Connectors 156 of the identity management system 150 may thus request or otherwise obtain data from various touchpoint (or source) systems within enterprise environment 100 to obtain identity management data 154. These source systems may include, for example Active Directory systems, Java Database Connectors within the enterprise 100, Microsoft SQL servers, Azure Active Directory servers, OpenLDAP servers, Oracle Databases, SalesForce applications, ServiceNow applications, SAP applications or Google GSuite.

The identity management system 150 can store identity management data 154 in an identity management data store 155. This identify management data store 155 may be, for example, a relational data store, including SQL based data stores such as a MySQL database or the like. The identity management data 154 stored may include a set entries, each entry corresponding to an identity management artifact as discussed. For example, the identity management data 154 may include entries on an identity (e.g., alphanumerical identifiers for identities) as defined and managed by the identity management system, a list or vector of entitlements, roles or access profiles assigned to that identity by the identity management system or other types of artifacts. A time stamp at which the identity management data was collected (e.g., from a source system) may be associated with the data for a particular artifact. Other data could also be associated with each artifact, including data that may be provided from other systems such as a title, location or department associated with the identity. In one embodiment, the identity management data 154 for an artifact (e.g., identity) can be stored in a cube (e.g., "Identity Cube") where all identity management data 154 associated with a particular artifact (e.g., for an identity all of their accounts from all data sources, and all attributes and entitlements of those accounts) may be associated.

As another example, the identity management data 154 may also include entries corresponding to entitlements and roles, where each entry for a role may include the role identifier (e.g., alphanumerical identifier or name for the role) and a list or vector of the entitlements associated with each role. Other data could also be associated with each role, such as a title, location or department associated with the role. Moreover, the identity management data 154 may also include event data collected from various systems within the enterprise environment 100 that is associated with the identities defined in the identity management data 154 through the evaluation or analysis of these events or other data in an identity management context. A user may interact with the identity management system 150 through a user interface 158 to access or manipulate data on identities, roles, entitlements, events or generally preform identity management with respect to enterprise environment 100.

As part of a robust identity management system, it is thus desirable to effectively search the identity management data 154 associated with an enterprise 100. Specifically, it is desired to provide an identity management system with effective ways to store, index and search such identity management data to increase the efficacy of search of identity management data at least by speeding the searching of such identity management data and improving the results of this searching. Identity management system 150 may thus include search system 160 having an identity management document store 162 (also referred to herein as a search index). This identity management document store (or just document store) 162 may, in one embodiment, be a NoSQL data store designed to index, store, access, retrieve and search documents 161 such as, for example, Elasticsearch, MongoDB, Azure Cosmos or the like. The document store 162 may thus include an interface (e.g., a REpresentational State Transfer (REST) API or the like) whereby requests for the indexing, access or searching of documents 161 may be sent through the interface. This interface may receive queries in a native syntax specific to the data store 162 and return results to those queries.

Search system 160 may store data included in, or derived from, identity management data 154 in the document store 162 using such an interface. Specifically, in certain embodiments, the search system 160 may be in communication with a sync pipeline 164. The sync pipeline 164 may access the identity management data 154 and evaluate the identity management data 154 of the relational data store to transform the identity management data 154 stored therein into documents according to a denormalized document model for identity management artifacts. The sync pipeline 164 can then generate messages for indexing and storing these documents in the document store 162 and send the indexing messages to the search service 160 either atomically or in bulk. These indexing messages may instruct a document store 162 to store documents for identity management artifacts or to nest one or more identity management artifacts in an associated identity management artifact.

In one embodiment, sync pipeline 164 may include an aggregator 165. The aggregator 165 may at some time interval, receive updates from, or query, the identity management data store 154 to identify which artifacts have been created, updated, and deleted. The aggregator 165 can also query the identity management data 154 to determine data associated with those artifacts. Additionally, the sync pipeline 164 may include a sync interface 167 through which indexing messages (e.g., events) may be received from various services 170 employed by the identity management system 150 (e.g., when those services have data they wish to be indexed in documents 161 in document store 162). Based on the artifacts the sync pipeline can assemble a sync message (e.g., a indexing message) for one or more artifacts (e.g., a message for creating, updating or deleting a document 161 corresponding to that artifact in the document store 162). In one embodiment, the aggregator 165 may serve to buffer, merge or orchestrate determined data, received indexing messages or the sending of sync messages such that requests (e.g., sync or indexing messages) to the other components (e.g., the document store 162) of the identity management system may be efficiently dispatched while still maintaining substantially real-time updates to the documents 161 in the document store 162.

These indexing messages can be received by the document store 162 and used to index the data for documents 161 for the identity management artifacts in the data store 162. In particular, the document store 162 may be configured according to a mapping definition which tells the document store 162 how to index the fields stored in the documents 161 stored therein. An example of such a mapping definition is provided in the Appendix. The documents 161 in the data store may thus represent the identity management artifacts of the enterprise 100 according to a nested denormalized document model. There may thus be a document for each artifact (e.g., identity, entitlement, role, event, access profile, account activity, etc.) associated with the enterprise environment 100. In certain embodiments, these documents formed according to the data model may be nested documents whereby a document for an identity management artifact (e.g., such as an identity, role, event, etc.) may include, as a nested or child document, documents for related identity management artifacts, even in instances where documents for those related identity management artifacts may be separately stored and indexed in the document data store 162 (e.g., as top level, root, or parent documents). In other words, in certain embodiments the documents 161 are formed according to a data model by which certain document 161 for related artifacts may be nested inside those related documents 161, even in cases where those documents 161 are themselves stored independently in the data store 162 (e.g., as separate documents 161). This configuration may allow more efficient storage and searching of related documents or objects in the data store 162. For example, an Identity document may have zero or more nested accesses, accounts, groups or application documents related to that Identity document, even in instances where those accesses, groups, accounts or applications are themselves maintained as separate documents 161 in the data store 162.

As an example of identity management data that may be obtained from an identity management system, the following is one example of a Javascript Object Notation (JSON) object that may relate to an identity:

```
{
  "attributes": {
    "Department": "Finance",
    "costcenter": "[R01e, L03]",
    "displayName": "Catherine Simmons",
    "email": "Catherine.Simmons@demoexample.com",
    "empId": "1b2c3d",
    "firstname": "Catherine",
    "inactive": "false",
    "jobtitle": "Treasury Analyst",
    "lastname": "Simmons",
    "location": "London",
    "manager": "Amanda.Ross",
    "region": "Europe",
    "riskScore": 528,
    "startDate": "12/31/2016 00:00:00AM UTC",
    "nativeIdentity_source_2": "source_2",
    "awesome_attribute_source_1": "source_1",
    "twin_attribute_a" : "twin_a",
    "twin_attribute_b" : "twin_b",
    "twin_attribute_c" : "twin_c"
  },
  "id": "2c9084ee5a8de328015a8de370100082",
  "integration_id": "iiq",
  "customer_id": "ida-bali",
  "meta": {
    "created": "2017-03-02T07: 19: 37.233Z",
    "modified": "2017-03-02T07:24: 12. 024Z"
  },
  "name": "Catherine. Simmons",
  "refs": {
    "accounts": {
      "id": [
        "2c9084ee5a8de328015a8de370110083"
      ],
      "type": "account"
    },
    "tags": [
      {
        "id": "2c9084ee5a8ad545345345a8de370110083"
        "name": "SOD-SOX",
        "type": "TAG"
      },
      {
        "id": "2c9084ee5a8ad545345345a8de370122093"
        "name" : "PrivilegedAccess",
        "type": "TAG"
      },
]
```

```
      "entitlements": {
        "id": [
          "c9084ee5a8de328015a8de449060e54",
          "2c9084ee5a8de328015a8de449060e55"
        ],
        "type": "entitlement"
      },
      "manager": {
        "id": [
          "2c9084ee5a8de022015a8de0c52b031d"
        ],
        "type": "identity"
      }
    },
    "type": "identity"
}
```

As another example of identity management data that may be obtained from an identity management system, the following is one example of a JSON object that may relate to an entitlement:

```
{
  "integration_id": "bd992e37-bbe7-45ae-bbbf-c97a59194cbc",
  "refs": {
    "application": {
      "id": [
        "2c948083616ca13a01616ca1d4aa0301"
      ],
      "type": "application"
    }
  },
  "tags": [
    {
      "id": "2c9084ee5a8ad545345345a8de370110083"
      "name": "SOD-SOX",
      "type": "TAG"
    },
    {
      "id": "2c9084ee5a8ad545345345a8de370122093"
      "name" : "PrivilegedAccess",
      "type": "TAG"
    },
  ]
  "meta": {
    "created": "2018-02-06T19:40:08.005Z",
    "modified": "2018-02-06T19:40:08.018Z"
  },
  "name": "Domain Administrators",
  "attributes": {
    "description": "Domain Administrators group on Active Directory",
    "attribute": "memberOf",
    "aggregated": true,
    "requestable": true,
    "type": "group",
    "value": "cn=Domain Administrators,dc=domain,dc=local"
  },
  "id": "2c948083616ca13a01616ca1f1c50377",
  "type": "entitlement",
  "customer_id": "3a60b474-4f43-4523-83d1-eb0fd571828f"
}
```

Other examples of document mappings and models are presented in the attached Appendix.

Search system 160 may thus offer an interface 168 through which the documents in the data store 162 may be queried. This interface may allow queries to be submitted where the queries may be formulated according to a search query string syntax that allows the querying of nested documents (or data in nested documents) of the data store 162. The query syntax utilized by embodiments may comprise a combination of terms or operators. The terms are the items (e.g., words, dates, numbers, other values) you are looking to match in the documents stored in the document store 162. Terms can also be grouped together into phrases (e.g., by enclosing the terms in double quotes). The operators consist of Boolean operators like AND, OR, NOT, etc. plus operators used for grouping. There are also operators which help narrow the search and take advantage of the different field types to include, for example, wildcards, fuzzy matching, regular expressions and ranges.

In particular, the search query syntax may include a nested query identifier (also interchangeably referred to as a symbol or operator) by which nested queries within a document may be preceded by the nested query identifier, operator or symbol (e.g., @ in one embodiment) to identify nested document (or artifact) types and search terms for those nested documents. The interface 168 may also allow "free text" search queries to be submitted, thus allowing for searching the documents in the data store 162 without prior knowledge about which field or fields to look in, or even what fields the documents may contain. Moreover, the interface 168 may offer the ability for the user to save such search queries such that they may be executed at a later point or at some time interval to return results or, for example, to raise a notification or an alarm, or for proactive governance actions on query results. The query syntax used for such queries may provide query operators that allow specification of nested keywords or terms to be searched. This query syntax may be an extension, or be otherwise based on, a query syntax offered by data store 162. For example, in one embodiment, the query syntax may be an extension of the Elastic Lucene based Query String syntax that allows the ability to query nested documents.

The search interface 168 can receive these queries, formulated according to the search query string syntax, and may evaluate the received queries to extract nested search expressions (e.g., expressions of a search query related to nested documents). The documents 161 of the data store 162 can then be searched based on the query, whereby any nested document within the documents 161 identified in the search query (e.g., by the @ nested query identifier) may be search according to their specified search terms.

In one embodiment, for example, the search interface 168 may lex and parse the query string to extract nested queries identified by the nested query operators specified in the query syntax. It may be the case that the search interface 168 may only need to search documents of a particular type based on the query. For example, if the query specifies a nested artifact type, and only documents of a certain type have nested artifacts of the specified type, only those documents may need to be searched. The search interface 168 can then examine the structure of the hierarchy to arrange the terms of the received query and form a query expression native to the NoSQL data store (e.g., expressed in a format according to a search API offered by the NoSQL data store) representing the received query, wherein the native query expression reflects the nesting of the originally received query. For example, the query may be formed according to a native syntax of the data store 162 such as the Elastic Search Query DSL Boolean syntax. The native query expression can then be submitted to the NoSQL data store 162 using the interface (e.g., API) of the NoSQL data store 162. The documents returned by the NoSQL data store 162 in response to the submitted search (or identifiers or portions thereof) can then be returned to the user. Thus, while nested objects embedded inside a root object may be searchable through the search interface, the root object may be returned as the search result in the search interface.

As can be seen, the ability to query identity management data in a quick and powerful manner may prove quite useful to users of these types of identity management systems. However, in addition to quickly and efficiently implementing direct user searches of identity management data, these search systems may be employed by various services and functionality of the identity management system 150 to improve the functionality and speed of these various services. For example, in one example, the identity management system 150 may offer the ability to implement or facilitate a certification campaign with respect to the enterprise 100. The search system 160 may be utilized in association with the definition or implementation of a certification campaign to allow a user to more easily determine or specify the identities, entitlements or access items (e.g. roles, access profiles) which should be included in such a certification campaign.

To elaborate, as has been discussed, by managing the identity or identities to which users within the enterprise computing environment are assigned, the entitlements which a user may assigned (e.g., the functions or access which a user may be allowed) may be controlled. However, escalating security and privacy concerns are driving governance, access risk management, and compliance to the forefront of Identity Management. Yet many companies still struggle with how to focus compliance efforts to address actual risk in what usually is a complex, distributed networked computing environment. Decisions about which access entitlements are desirable to grant a particular user are typically based on the roles that the user plays within the organization. In large organizations, granting and maintaining user access entitlements is a difficult and complex process, involving decisions regarding whether to grant entitlements to thousands of users and hundreds of different applications and databases. This complexity can be exacerbated by high employee turnover, reorganizations, and reconfigurations of the various accessible systems and resources.

However, to effectively meet the requirements and desires imposed upon enterprises for Identity Management, these enterprises may be required to prove that they have strong and consistent controls over who has access to critical applications and data. As but one example, enterprises are often required by regulatory agencies or for other reasons, to conduct what is known as a certification campaign. A certification campaign is typically an enterprise-wide event that is regularly performed (e.g. quarterly) to validate access entitlements for the identities in the enterprise. These campaigns may be, for example, mandated as part of internal or sometimes external auditing processes. In some cases, failure to maintain certain levels of governance can result in hefty fines by government agencies. Typically, a certification campaign has a wide coverage of a large portion, if not the totality, of the population of identities of an enterprise.

In most cases, during a certification campaign, a manager, an application source owner, or an access entitlement owner is required to certify tens if not hundreds or thousands of identities for most, if not all, the access entitlements held by these identities. In other words, the manager or an access entitlement owner may be presented with a identity and an associated entitlement and asked to approve or deny the assignment of the entitlement to the identity. Again, as there may be tens of thousands of identities and perhaps hundreds of thousands (or more) entitlements in an enterprise, this certification requires substantial time and energy resources. Typically, IG industry solutions provided these managers and access owners with bulk approval mechanisms to help automate these certification events by making it feasible for these managers to issue multiple approve/deny decisions. For example, a manager could elect to approve most of identities in-bulk for the non-privileged access entitlements in order to focus on decisions pertaining to the privileged ones. As may be imagined, such bulk approval mechanisms encouraged a less than thorough review of the actual entitlements granted each identity. Thus, instead of serving to increase security and improve identity governance within the enterprise, these bulk approval methods and identity governance solutions only served to propagate any existing security risks.

Similarly, an access request may be the formal process in enterprise identity governance, to grant an access entitlement (typically for the first time) to an identity. Usually, the manager of the identity, or the entitlement owner, will have to make a decision to approve or deny the requested entitlement(s) to the said identity. Although the number of access requests may not compare to those handled during a certification campaign, access requests typically require a higher level of scrutiny as they concern rewarding highly privileged entitlements or rewarding an entitlement to an identity for the first time. However, given the bulk approval mechanisms utilized by typical IG solutions, a manager or entitlement owner may wait until a critical mass of these access requests have been built up and use such bulk solutions to evaluate these access requests en masse. Such a methodology serves to undermine either the security of an enterprise (e.g., by mass approval of the granting of entitlements, some of which may be security risks) or the functionality of the enterprise (e.g., by denying access entitlements to those identities who may actually need them to accomplish their goals).

Unfortunately, then, bulk approval mechanisms, albeit useful, can do more harm than good, as such tools get abused. Abuse of such tools may result in degrading the quality of identity governance (and thus security) within an enterprise. Some issues of concern include an explosion of entitlements, as bulk-approving mechanisms are more likely to cause an inflation of the granting of entitlements to identities that do not necessarily require them. As another concern, such bulk approval mechanisms may lead to the maintenance of access entitlements that are no longer required (e.g., when an identity changes teams, title, or business role but still keeps entitlements from prior engagements). Ultimately, the most serious concern may be the bulk approval of privileged entitlements without exercising the due diligence, resulting in an increased security risk, the exact opposite of what is intended or desired.

To assist in mitigating these security risks in an enterprise environment, therefore, it is of utmost importance to effectively analyze access or entitlement data in the enterprise environment to identify potential risks and accurately assign entitlements to identities. Moreover, in previous identity management systems, when design or composing these certification campaigns, it may be difficult to generate enterprise wide or cross organizational certifications dues to the time required to search identity management data (e.g., because of the way identity management data is stored and searched as discussed. Additionally, these same problems may lead to a of visibility for correct inclusion of identities and entitlements, and therefore risk of (in)validity of such certification campaigns.

By narrowly defining a certification campaign based on a more limited or targeted set of identities or entitlements, the scope of a certification campaign can be narrowed, allowing the person responsible for approving or denying such access requests to perform a more thorough or complete assessment of whether to approve or deny such assigned access.

To that end, then, embodiments of an identity management system may utilize the search system 160 to allow a user to define a certification campaign. Specifically, as part of the definition of a certification campaign, a search interface may be presented to a user through the user interface for the certification campaign. The user can submit a search query according to an embodiment of the search query language discussed above. The identities or entitlements returned in response to such a search may be presented in the user interface for the certification campaign and the user may utilize these identities or entitlements (or attributes or other artifacts associated therewith) to define the included access items for review in that certification campaign. Using such a user interface including the search, a user can thus quickly and easily refine and tune the searches submitted (and thus the results obtained) in order to better tailor the identities and entitlements that may be part of a certification campaign.

As another example of where the search system 160 may be usefully employed in improving the functionality of the identity management system is the definition of policies within the identity management system 150 to ensure that identities don't have access to entitlements that risk the enterprises assets or data (or for other reasons). For example, a particular type of these polices are separation of duties (SoD) policies. SoD policies help ensure that identities do not have access to conflicting set of entitlements. For instance, an enterprise may desire that a person responsible for hiring vendors (and having access to associated systems) should not also have entitlements to systems allowing payment to those vendors.

To assist in the specification of policies (including SoD policies), the evaluation of current policies, the assessment of compliance with policies or generally the management of policies, embodiments of an identity management system may utilize the search system 160 to allow a user to submit queries in association with, or based on, such (SoD) policies. Specifically, in one embodiment, as part of the definition of a SoD policy, a search interface may be presented to a user through the user interface for the certification campaign for remediation. The user can submit a search query according to an embodiment of the search query language discussed above. The identities or entitlements returned in response to such a search may be presented in the user interface and used to create or define a SoD policy.

Similarly, embodiments of an interface offered by the identity management may provide the ability for a user to select a previously defined SoD. The selected SoD can be transformed into a search query according to the search query language previously discussed and this search query submitted to the search system 160. The results of this search query can then be displayed to the user to assess, for example, compliance (or lack thereof) of the SoD policy or those identities or entitlements to which the SoD policy applies. Other examples of the uses of such search systems and document models may be realized from U.S. patent application Ser. No. 16/440,690 filed on Jun. 13, 2019 by Anderson et al, which is hereby incorporated by reference herein in its entirety.

Figure 2:
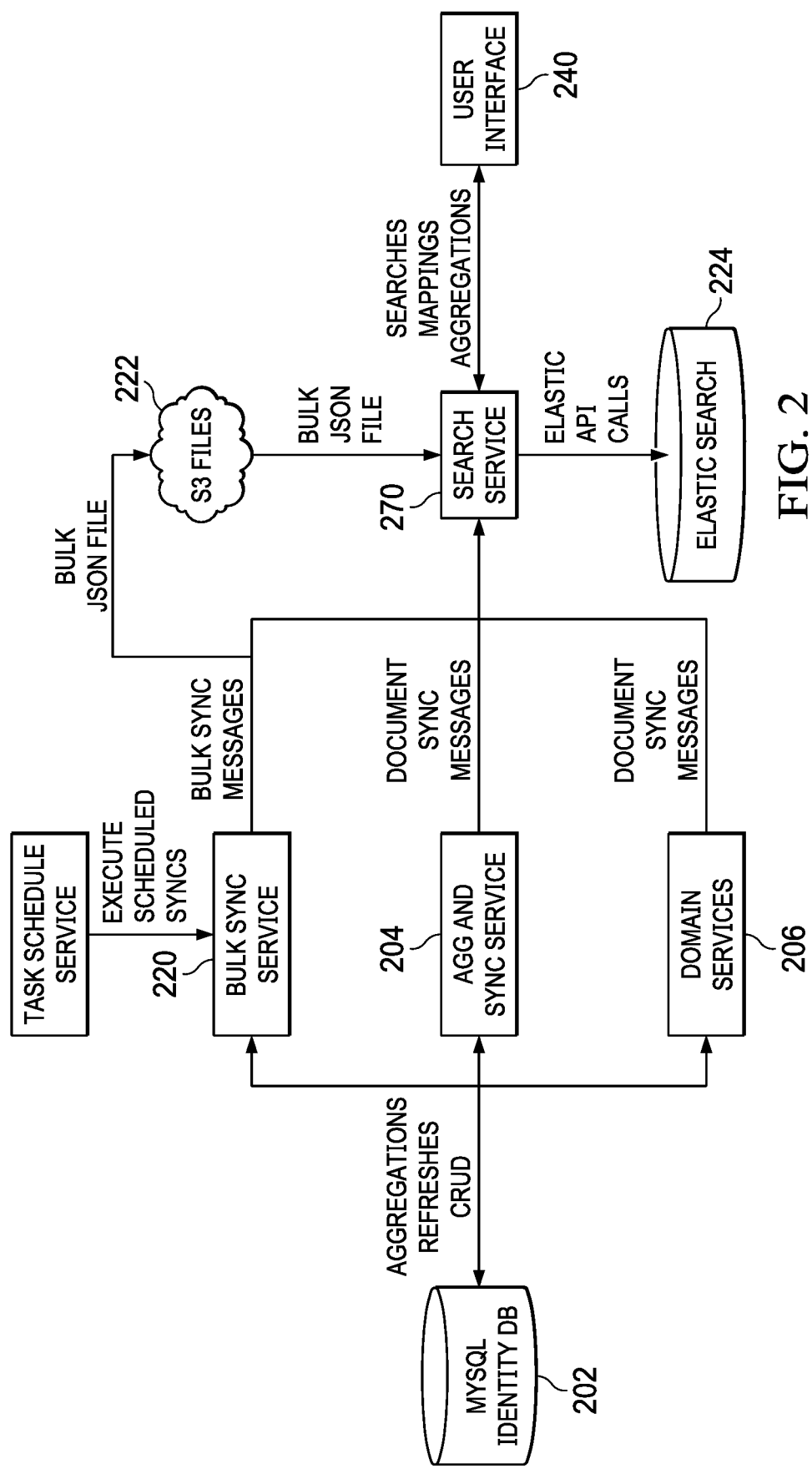
FIG. 2 is a block diagram of an architecture of a search system of an identity management system that is adapted to index and search nested documents for identity management artifacts.

Moving now to FIG. 2, one embodiment of an architecture for implementing the indexing of data related to identity management artifacts is depicted. Here, the artifact database 202 may be a relational database that stores artifacts and related data including, for example, identities, entitlements, roles, access profiles, accounts, applications, account activity, or events. The data in this database 202 may be aggregated from multiple sources (e.g., source systems) within an enterprise and may be obtained through connectors that work with such sources systems, including but not limited to Active Directory, Workday, Salesforce, HR systems, JDBC, and many other systems. As discussed, in some embodiments, these source systems may provide accounts or entitlements that are correlated into identity cubes representing a unified identity view of disparate sources.

Whenever an aggregation or artifact refresh occurs (e.g., based on some time period), sync service 204 may be called by the identity management system to query artifact database 202 to identify which artifacts have been, or which should be, created, updated, associated, or deleted. The sync service 204 then assembles a (e.g. JSON) sync document by reading the artifact data and making subsequent queries to any related tables need to obtain data for the artifact, including for example, entitlements, roles, access profiles, accounts or applications. In one embodiment, the sync service 204 may maintain a document for each artifact, thus a hash may be calculated for a document for the artifact and compared against a previous hash stored in for the artifact. If the hashes are different (e.g., indicating changes have occurred for the document for the artifact) then the document for the artifact is then transformed into a document suitable for indexing into the search index and sent in an indexing message to the search service 270.

In addition to the sync service 204, various domain services 206 exist for different types of artifacts including for example, identities, entitlements, provisioning, sources, and access profiles. When changes occur including creates, updates, and deletes to these artifacts indexed in the search service, the respective domain service 206 creates a JSON sync document to index the data related to that artifact and send an indexing message with the indexing data to the search service 204 for indexing of the data.

In one embodiment, the bulk sync service 220 provides an alternate way to synchronize data from the artifact database 202. The bulk sync service 220 takes a query specifying what data and criteria to include in the sync and also a transformer specifying how to build and transform the sync objects from the queried data. This bulk sync service 220 runs the query and transforms one or more artifacts into a file (e.g., a JSON file) and uploads into a file store 222 such as an AWS S3 file store. A message is then sent from the bulk sync service 220 to the search service 270. Based on the reception of this request, the search service 270 may download the file from the file store 222 and index the documents included in the downloaded file into the document store 224 (e.g., the search index). The document store 224 may be, for example, an Elasticsearch document store providing an Elasticsearch interface.

The document store 224 may thus store documents for identity management artifacts, including those that it may be desired to search (e.g., such as Identity, Entitlement, Role, Access Profile, Account Activity, and Event. Embodiments of such a model may be comprised of attributes, sections for dynamic attributes, and also nested objects denormalized from the artifact database 202 to provide improved search performance, flexibility, and precision. Examples of such model are depicted in the Appendix.

The search service 270 may be the main access point to the document index store 224. The search service 270 may handle the creation, updates, configuration, and maintenance of the indices in the data store 224 (e.g., the Elasticsearch cluster) including an index mapping schema defining how to index documents (e.g., received through indexing requests or in the bulk sync mechanism). Examples of such mapping schemas are provided in the Appendix herein. The search service 270 can, for example, be configured to execute bulk syncs using the bulk sync service 220 on a scheduled interval for different types of artifacts. This search service 270 can also specify other syncing parameters, such as to only sync data changed after a certain date. The search service 270 can batch the documents received and route them to the appropriate index.

The search service 270 also provides interfaces to allow for searching of the documents, aggregation queries on the documents, and provides a description of the index mappings to, for example, power search query autocomplete functionality. The search service 270 may allow for search queries to be saved and shared and also provides the ability to schedule searches to be run and results to be emailed to subscribers.

Accordingly, user (or internal) interfaces 240 for the identity management system may call the search service 270 to execute queries and obtain or display the results. These interfaces may utilize search service 270 to return a mapping of the queryable attributes to provide search query autocomplete. In one embodiment, the user interface may send queries to the search service 206 in a modified Elastic Search Lucene query syntax that has been extended to allow simple searching of nested documents in the document store 224. In this manner, search criteria can be made available to users to be used in queries to locate identity management artifacts associated with that search criteria. As discussed, the search service may additionally provide an interface for querying the documents for the identity management artifacts stored in the data store of the search service. The interface may accept queries formulated according to a search query string syntax that allows queries to be formed whereby the documents of the data store may be queried.

When constructing the search, the search interface 270 may allow the specification of values the search criteria. The search service can receive these queries formulated according to the search query string syntax and evaluate the received queries against the document in the data store to determine artifacts to which the search criteria applies. These artifacts (e.g., associated with the tags of the search query) can then be returned in response to the search.

In particular, the user interface 240 may allow queries to be submitted where the queries may be formulated according to a search query string syntax that allows the querying of nested documents (or data in nested documents) of the data store 224. The user interface 240 may, for example, give a user the ability to select a type of identity management artifact (e.g., identities, entitlements, roles, etc.) and specify a search query to be performed on the documents of the search index associated with that type of identity management artifact. The interface 240 may also allow "free text" search queries to be submitted, thus allowing for searching the documents in the data store 224 without prior knowledge about which field or fields to look in, or even what fields the documents may contain. The query syntax used for such queries may provide query operators that allow specification of nested keywords or terms to be searched. This query syntax may be an extension, or be otherwise based on, a query syntax offered by data store 224. For example, in one embodiment, the query syntax may be an extension of the Elastic Lucene based Query String syntax that allows the ability to query nested documents.

The search interface 270 can receive these queries, formulated according to the search query string syntax, and may evaluate the received queries to extract nested search expressions (e.g., expressions of a search query related to nested documents) from data store 224. In one embodiment, for example, the search interface 270 may lex and parse the query string to extract nested queries identified by the nested query operators specified in the query syntax. The search interface 270 can then examine the structure of the hierarchy to arrange the terms of the received query and form a query expression native to the data store 224 (e.g., expressed in a format according to a search API offered by a NoSQL data store) representing the received query, wherein the native query expression reflects the nesting of the originally received query. For example, the query may be formed according to the Elastic Search Query DSL Boolean syntax. The native query expression can then be submitted to the NoSQL data store 224 using the interface (e.g., API) of the data store 224. The documents returned by the data store 224 in response to the submitted search (or identifiers or portions thereof) can then be returned to the user through the user interface 240.

Embodiments thus provide numerous advantages over previously available systems and methods for managing or searching identity management data. Some of these advantage relate to the ability of embodiments to allow users to take advantage of complex search capabilities without engaging in expensive and technically complex implementation problems such as the reconfiguration or rebuilding of data tables, schemas or formats. In particular, as embodiments are based on particular models of identity management data and artifacts thereof, the identity management data may be stored and indexed (e.g., as documents in a NoSQL data store such as Elasticsearch) in a manner that may be updated on a substantially real-time basis and quickly searched. data can subsequently made available to manual, automated, and machine learning decisions, and workflows. The accuracy, consistency, scale, and speed of governance decisions increase through access to this information.

It may now be useful to discuss embodiments of the tagging and searching of such identity management artifacts. FIG. 3 depicts one embodiment of a search interface that may be presented that allows a user to enter a search query in the search portion 302 of the interface. Results may be returned in a results portion 320 of the interface. These results may be individually selected (or all results selected) using check boxes associated with each resulting artifact. Here, for example, the user has searched for roles in the search portion 302 and had 200 results returned, 6 of which are currently displayed in the results portion 320 of the interface. The user has selected three of the displayed roles using the check boxes associated with those resulting artifacts.

Thus, users may utilize an embodiment of a search syntax to formulate a search query. In one embodiment, the organization of documents in the search index is represented in JSON. All items in the JSON of the documents in the search index can be searched, and examples of the syntax for such searching are defined below. Such a syntax may be utilized, for example, in association with the embodiments of the JSON data models for various artifacts that are included in the Appendix. In order to support a simplified query string syntax in one embodiment this syntax may extended a syntax offered by the search index (e.g., the Elastic Lucene-base Query String syntax) with the ability to query nested documents.

Because in particular embodiments, artifact data is stored in the search index in a JSON format, the data being searched for may be contained in multiple levels of categories. For example, if a search is being conducted for an identity's first name as it is listed in the identity document a search may need to specify that is to be used to search in that identity's attribute and for searching the firstname attribute. The search may also specify the first name (e.g., value) that is actually being searched for. Each of these levels of data helps obtain better quality search results, and may be referred to differently. The syntax utilized may allow specification of different levels of attributes, object or documents. For example, first-level fields (also known as top-level fields) may be searched directly. To search second-level fields, they may be appended to a first-level field with a period. Nested queries to search on fields that are third-level or lower. It will be noted that this syntax for searching fields of documents may be combined with traditional search operators (e.g., Boolean search operators) to structure a search query.

First-Level Field Searches

To search first-level fields of an identity management artifact, embodiments of the syntax may utilize the following format:

field:<search terms>

First level fields may include second-level fields or nested-level fields, as will be described at a later point. When a category to search within to find data is specified in a search, the deepest category searched in is the first-level field. In some cases, only need a single field is needed for a search. This is the first-level field. If more than one field to is needed to find desired data, the category that is typed last and that appears closest to the search terms in the query, is the first-level field. A first-level field contains actual data, as opposed to containing additional fields to search in.

For example, in the search query in FIG. 4A, "location" is the first-level field. Visually, it's the closest field to the data, before the colon, which indicates it's the category that contains the data being searched for.

As another example, in the search query in FIG. 4B, "name" is the first level field. In searches where there's only one field listed, that may always be the first-level field. In the search query in FIG. 4C there are three first level fields, because there are three parts to the query. These fields are "name," "privileged," and "entitlementCount."

Second Level Field Searches

Second-level fields are a type of object. In JSON, an object may be any category that, instead of containing data, contains more fields. Each second-level field may include a specific set of first-level fields. In embodiments of a search syntax, these fields are followed by a period, a first-level field, and the search term. This means that second-level fields and nested-level fields may both be objects. Each second-level field contains at least one first-level field. These fields can give additional information about your identities and their data.

To search second-level fields, embodiments of the search syntax may use the following format:

secondLevelField.firstLevelField:<search terms>

For example, attributes.firstname:John will return all identities with John in their firstname attribute in the enterprise. As an illustration, in the search query in FIG. 4D "@access" and "source" are both objects. In the search query in FIGS. 4E and 4F "attributes" is an object, because it contains the first-level field "firstname" or "location", while In the query in FIG. 4G, "source" is the second-level field, because it contains the first-level field "name." It's contained within a nested object called "@accounts."

Structure for Nested Queries

If a JSON line has two or more levels of data inside of it, it is known as a nested object, and embodiments may utilize a nested query to search nested objects of documents for artifacts.

For example, applications, accounts, and access artifacts may include nested objects, and may require nested queries because an identity can have more than one of each type. Nested objects can contain second- and first-level fields, or only first-level fields. In embodiments of the syntax these nested queries may be preceded by an @ (or other nester query identifier) symbol.

To create a nested query, the format in one embodiment is (depending on what level the document is nested):

```
@nestedObject(firstLevelField:query)
@nestedObject(object.field:query) or
@nestedObject(secondLevelField.firstLevelField:query)
```

For example in the query depicted in FIG. 4H, "@accounts" is the nested object. It contains the second-level field "source," which contains the first level field "name."

Figure 5:
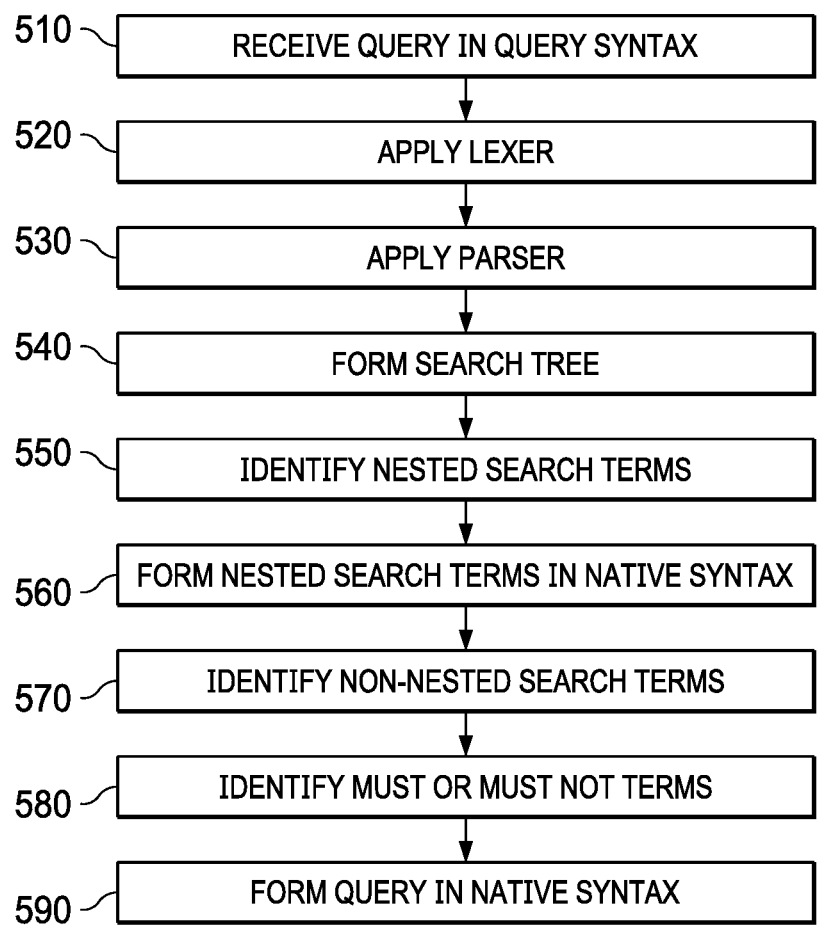
FIG. 5 is a flow diagram of a method that may be used by embodiments of an identity management system.

It may be helpful here to give certain example of queries formulated according to embodiments of a syntax that may be used to search a nested document. In the following examples, the queries have been formed to search Identity artifacts according to the example data models for an Identity as given in the Appendix:

Moving to FIG. 5 then, a flow diagram of one embodiment of a method for forming a query in a search syntax based on embodiments of the search syntax disclosed herein is depicted. Such a method may be utilized, for example, to form a query according to the search syntax offered by a search indices storing identity management artifacts based on a query submitted by a user (e.g., either human or automated) formed according to the nested search query syntax provided herein. For example, embodiments may convert the search query as expressed in the syntax provided by embodiments to the Elastic Search Query DSL Boolean syntax.

At step 510 the query formed according to the nested search query syntax is received. At step 520, a lexer can be applied to the query at step to determine the tokens of the received query and a parser applied to the tokens at step 530 to form a search tree comprising the terms of the received query at step 540. Any nested search terms of the query can then be identified at step 550 using the nested query identifier of the search syntax (e.g., expressed in the form of an @ operator plus the nested keyword and then the nested search expression enclosed in parenthesis). In one embodiment, each nested query term can be transformed into the full path value and the nested path value appended to all fields of the search terms of that nested query term if it has not been added. The path value for the nested search expression thus becomes the full path relative to the top level document. For example, when converting the syntax to

| Query | Description |
| --- | --- |
| @accounts(source.name:Acme) | Searches within each identity's accounts for the source name, Acme. |
| @access(privileged:true) | Searches within each identity's access for items marked as privileged. |
| @apps(source.name:"Azure AD") | Searches within each identity's apps for apps that have an account source identical to Azure AD. |
| @accounts(source.name:Acme) AND NOT @apps(name:Adobe) | This query returns all identities who have an account on the Acme source, but don't have the Adobe app. |
| @accounts(disabled:true) && @access(name:Building_Access) | This query returns all identities with disabled accounts who have an entitlement with the title Building_Access. |
| @access(name:"Acme Accounts Payable") AND @access(name:"Acme Accounts Receivable") | This query returns a list of all identities that have the access profiles Acme Accounts Payable and Acme Accounts Receivable. |
| @access(displayName:"Engineering_Access") AND manager.name:"amanda.ross" | This query returns a list of all identities that have amanda.ross listed as their manager and who have the access item that has the display name Engineering_Access. |
| @access(name:"Admin_Access") AND attributes.location:Chicago | This query returns a list of all identities in Chicago that have an access item exactly called Admin_Access. |
| status:"Not Invited" AND @access(displayName:"Base Access") | This query returns a list of all identities who are listed as Not Invited in the identity list, who have an access item called Base Access. |
| @accounts(source.name:Linux AND disabled:true) | This query returns Identities with disabled Linux accounts |
| accountCount:>12 | This query returns Identities with access to over 12 accounts |
| @access(name:AccountsPayable) AND @access(name:AccountsReceivable) | This query returns Identities who have access to both Accounts Payable and Accounts Receivable. |
| manager.name:"amanda.ross" AND (status:Active AND (phone:1235551234 OR phone:9875559876)) | This query returns all identities with Amanda Ross as their manager, as long as they are in the Active status and their phone number is either 123-555-1234 or 987-555-9876. |
| @access(*) AND status:Disabled | This query returns a list of identities who have any access at all, who are in the Disabled identity status. |
| attributes.cloudLifecycleState:disabled AND @accounts(disabled:false) | This query returns a list of all identities in the Disabled lifecycle state that have any account enabled. |
| attributes.cloudLifecycleState:disabled AND NOT @accounts(disabled:false) | This query returns a list of all identities in the Disabled lifecycle state that have all of their accounts disabled. |

Elastic Search Query DSL Boolean syntax if the format for a nested search term is @nestedObject(object.field:query) the full path then becomes nestedObject.object.field. Each of the nested search terms can then be encapsulated or formed in the syntax of a nested query of the target syntax (e.g., the native syntax of the document data store) at step 560. For example, in the Elastic Search Query DSL Boolean syntax each nested query term may be formatted as a "nested" query.

The other (e.g., non-nested) search terms of the query can also be identified at step 570. The set of query terms (e.g., both non-nested and nested) can be sorted into must have, or must not have, categories based on the presence of any negation operators in the search term (e.g., a NOT operator or the like) or another criteria at step 580. The query can then be formed in the native syntax of the data store at step 590 by indicating the search terms any results must have and the search terms that any query results must not have. For example, the clauses in the must category may be included in a "must" occurrence type in the Elastic Search Query DSL Boolean syntax while the clauses in the must category may be included in a "must" occurrence type in the Elastic Search Query DSL Boolean syntax. When incorporating a nested search term into the query in the native syntax of the data store, the nested search term formed in the syntax of a nested query of the target syntax (e.g., as formed at step 560) can be incorporated into the query being formed.

As an example, the query

```
@access(source.name:"Active Directory
AND type:ENTITLEMENT) AND
attributes.location:London AND firstName:John
```

Can be transformed into the Elastic Search Query DSL Boolean syntax as in the following JSON:

```
{
"query": {
"bool" {
"must": [
{
"query_string": {
"query": "attributes.location:London
AND firstName:John"
}
},
{
"nested": {
"path": "access",
"query": {
        "query_string": {
        "query": "access.source.name:"
        Active Directory AND
        access.type:ENTITLEMENT"
                }
            }
         }
      }
   ]
 }
}
```

As another example, the query

```
NOT @access(source.name:"Active Directory
AND type:ENTITLEMENT) AND
attributes:location:London AND firstName:John
``` can be transformed into the Elastic Search Query DSL Boolean syntax as in the following JSON:

```
{
"query": {
"bool": {
"must": [
    {
    "query_string": {
    "query": "attributes:location:London AND firstName:John"
    }
    }
],
"must_not": [
    {
    "nested": {
    "path": "access",
    "query": {
    "query_string": {
    "query": "attributes.location:London AND firstName:John"
    }
     }
    }
   }
  ]
 }
}
}
```

Those skilled in the relevant art will appreciate that the invention can be implemented or practiced with other computer system configurations including, without limitation, multi-processor systems, network devices, mini-computers, mainframe computers, data processors, and the like. Embodiments can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

Although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a set of distributed computers communicatively coupled to a network (for example, the Internet). Any suitable programming language can be used to implement the routines, methods or programs of embodiments of the invention described herein, including R, Python, C, C++, Java, JavaScript, HTML, or any other programming or scripting code, etc. Other software/hardware/network architectures may be used. Communications between computers implementing embodiments can be accomplished using any electronic, optical, radio frequency signals, or other suitable methods and tools of communication in compliance with known network protocols.

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

APPENDIX:

EXAMPLE DOCUMENT MODELS

Access Profile Document Model

```
"accessprofile": {
    "id": "keyword",
    "name": "text",
    "description": "text",
    "modified": "date", // ISO 8601 format
    "created": "date", // ISO 8601 format
    "requestable": "Boolean",
    "@entitlements": {
        "id": "keyword",
        "name": "text",
        "description": "text",
        "attribute": "text",
        "value": "text"
    },
    "entitlementCount": "integer",
    "owner": {
        "id": "keyword",
        "name": "text"
    },
    "source": {
        "id": "keyword",
        "name": "text"
    },
    "synced": "date"
}
```

Sample

```
{
    "id": "id",
    "name": "name",
    "description": "description",
    "modified": "2018-09-07T17:49:33.667Z",
    "created": "2018-09-07T17:49:33.667Z",
    "requestable": true,
    "entitlements": [
      {
        "id": "entitlementId",
        "name": "name",
        "description": "description",
        "attribute": "attribute",
        "value": "value",
      }
    ],
    "entitlementCount": 1,
    "owner": {
      "name": "displayName",
      "id": "ownerId"
    }
     "source": {
       "name": "sourceName",
       "id": "sourceId"
     },
     "synced": "2018-09-07T17:44:29.362Z"
  }
}
```

AccountActivities Document Model

```
"accountactivities": {
    "@accountRequests": {
        "accountId": "text",
        "attributeRequests": {
            "name": "text",
            "op": "keyword",
            "value": "text"
        },
        "op": "keyword",
        "provisioningTarget": {
            "id": "keyword",
            "name": "text",
            "type": "text"
        },
        "result": { // dynamic object
            "errors": "text",
            "status": "keyword",
            "ticketId": "keyword"
        },
        "source": {
            "id": "keyword",
            "name": "text",
            "type": "text"
        }
    },
    "@approvals": {
        "comments": "text",
        "created": "date",
        "modified": "date",
        "owner": {
```

```
            "id": "keyword",
            "name": "text",
            "type": "keyword"
         },
         "result": "keyword",
         "type": "keyword"
   },
      "created": "date",
      "errors": "text",
      "execution": "keyword",
      "@expansionItems": {
         "accountId": "text",
         "attributeRequest": {
            "name": "text",
            "op": "keyword",
            "value": "text"
         },
         "cause": "keyword",
         "name": "text",
         "source": {
            "id": "keyword",
            "name": "text",
            "type": "text"
         }
      },
      "id": "keyword",
      "modified": "date",
      "name": "text",
      "origin": "text",
      "@originalRequest": {
         "accountId": "text",
         "attributeRequests": {
            "name": "text",
            "op": "keyword",
```

```
            "value": "text"
          },
          "op": "keyword",
          "source": {
            "id": "keyword",
            "name": "text",
            "type": "text"
          }
        },
        "requester": {
          "id": "keyword",
          "name": "text",
          "type": "keyword"
        },
        "sourceSummary": "keyword",
        "status": "keyword",
        "target": {

"id": "keyword",

"name": "text",

"type": "keyword"
        },
        "trackingId": keyword",
        "type": "text",
        "warnings": "text"
    }
}
```

Sample

```
{
    "id": "2c92808d60ec4e900160ec944db5000a",
    "name": "00000123455",
    "trackingId": "123455",
    "created": "2018-04-11T14:00:00Z",
    "modified": "2018-04-13T12:19:00Z",
    "status": "Incomplete",
    "execution": "Executing",
    "requester": {
        "id": "2c92808d60ec4e900160ec944db50012",
        "name": "Billy Rosewood",
        "type": "identity"
    },
    "target": {
        "id": "2c92808d60ec4e900160ec944db5012",
        "name": "Billy Rosewood",
        "type": "identity"
    },
    "errors": [],
    "warnings": [],
    "approvals": [{
        "created": "2018-04-11T12:20:00Z",
        "modified": "2018-04-12T12:13:01Z",
        "owner": {
            "id": "2c92808d60ec4e900160ec944db50013",
            "name": "Axel Foley",
            "type": "identity"
        },
        "result": "Approved",
        "comments": "Good to go."
    },
```

```
    {
        "created": "2018-04-12T12:13:01Z",
        "modified": "2018-04-12T20:13:01Z", "type":
        "Access Profile Owner",
        "owner": {
            "id": "2c92808d60ec4e900160ec944db50014",
            "name": "Dan Taggert",
            "type": "identity"
        },
        "result": "Approved",
        "comments": "If Axel agrees, I agree."
    }
],
"originalRequest": [{
    "accountId": "billy.rosewood",
    "op": "Assign",
    "source": {
        "id": "2c92808b60ec4e800160ec929d92001c",
        "name": "IdentityNow",
        "type": "internal"
    },
    "attributeRequests": [{
        "op": "Add",
        "name": "assignedRoles",
        "value": "Detectives"
    }]
}],
"expansionItems": [{
    "cause": "Role",
    "name": "Detectives",
    "attributeRequest": {
```

```
      "operation": "Add",
      "name": "",
      "value": "",
    }
    "source": {
        "id": "IdentityNow",
        "name": "IdentityNow",
        "type": "IdentityNow"
    }
    "accountId": "billy.rosewood"
}]
"accountRequests": [{
    "accountId": "cn=Billy Rosewood,dc=Users,dc=beverlyhillspd,dc=com",
    "op": "Modify",
    "source": {
        "id": "2c92808b60ec4e800160ec929d92001c",
        "name": "BHPD Active Directory",
        "type": "Active Directory"
    },
    "provisioningTarget": {
        "id": "2c92808b60ec4e800160ec929d92001c",
        "name": "BHPD Active Directory",
        "type": "Active Directory"
    },
    "attributeRequests": [{
        "op": "Add",
        "name": "memberOf",
        "value": "cn=Detectives,dc=Groups,dc=Users,dc=beverlyhillspd,dc=com"
    }],
    "result": {
        "status": "Success"
    }
```

```
}, {
    "accountId": "billy.rosewood",
    "op": "Modify",
    "source": {
        "id": "2c92808b60ec4e800160ec929d92001c",
        "name": "File",
        "type": "Delimited File"
    },
    "provisioningTarget": {
        "id": "2c92808b60ec4e800160ec929d92001d",
        "name": "Service Now",
        "type": "ServiceNowIntegration"
    },
    "attributeRequests": [{
        "op": "Add",
        "name": "groups",
        "value": "EvidenceSubmittal"
    }],
    "result": {
        "status": "Queued",
        "ticketId": "RITM001234"
    }
}, {
    "accountId": "billy.rosewood",
    "op": "Create",
    "source": {
        "id": "2c92808b60ec4e800160ec929d92001e",
        "name": "SAP P006",
        "source": "SAP"
    },
```

```
"provisioningTarget": {
    "id": "2c92808b60ec4e800160ec929d92001e",
    "name": "SAP P006",
    "type": "SAP"
},
"attributeRequests": [{
        "op": "Set",
        "name": "UserName",
        "value": "billy.rosewood"
    },
    {
        "op": "Set",
        "name": "FirstName",
        "value": "Billy"
    },
    {
        "op": "Set",
        "name": "LastName",
        "value": "Rosewood"
    },
    {
        "op": "Set",
        "name": "Department",
        "value": "Detective"
    },
    {
        "op": "Set",
        "name": "Company",
        "value": "Beverly Hills Police Department"
    },
```

```
      {
        "op": "Set", "name":
        "Role", "value":
        "Detective"
      }
    ],
    "result": {
      "status": "Success",
      "ticketId": null
    }
  }, {
    "accountId": "billy.rosewood",
    "op": "Create",
    "source": {
      "id":
      "2c92808b60ec4e800160ec929d920011",
      "name": "Salesforce",
      "type": "Salesforce"
    },
    "provisioningTarget": {
      "id":
      "2c92808b60ec4e800160ec929d920011",
      "name": "Salesforce",
      "type": "Salesforce"
    },
    "attributeRequests": [{
        "op": "Set",
        "name": "Email",
        "value": "billy.rosewood@bhpd.com"
      },
      {
        "op": "Set",
```

```
        "name": "FirstName",
        "value": "Billy"
      },
      {
        "op": "Set",
        "name": "LastName",
        "value": "Rosewood"
      },
      {
        "op": "Set", "name":
        "Profile", "value":
        "ChatterFree"
      }
    ],
    "result": {
      "status": "Error",
      "ticketId": null,
     "errors": [
          "Salesforce is down for maintenance."
      }
   }]
}
```

Entitlement Document Model

```
"entitlement": { "attribute":
    "text", "description":
    "text", "displayName":
    "text", "id": "keyword",
    "identityCount": "integer",
    "modified": "date",
    "name": "text",
    "privileged": "Boolean",
  "@tags": {
            "id": "keyword"
            "name" : "text",
            "type": "TAG"
    },
    "source": {
      "id": "keyword",
      "name": "text"
    },
    "synced": "date",
    "value": "text"
},
```

Sample

```
{
    "privileged": false,
    "displayName": "Administrator",
    "name": "Administrator",
```

```
"description": "Full administrative access to IdentityNow",
"modified": 1534184384805,
"id": "ff8081815c46b85b015c46b90d5702a9",
"tags": [
    {
        "id": "2c9084ee5a8ad545345345a8de370110083"
        "name" : "SOD-SOX",
        "type": "TAG"
    },
    {
        "id": "2c9084ee5a8ad545345345a8de370122093"
        "name" : "PrivilegedAccess",
        "type": "TAG"
    },
]

"source": {
  "name": "IdentityNow",
  "id": "ff8081815c46b85b015c46b90c7c02a6"
},
"attribute": "assignedGroups",
"identityCount": 5,
"value": "ORG_ADMIN",
"org": "navigate",
"pod": "royale",
"synced": "2018-09-04T03:30:23.853Z"

}
```

Event Document Model

```
"event": {
    "action": "keyword",
    "actor": {
        "name": "keyword",
        "type": "keyword"
    },
    "attributes": {  //"dynamic object"
        "SSO": {
            "contextId": "keyword",
            "ipAddress": "keyword"
        },
        "accountName": "text",
        "error": "text",
        "newValue": "text",
        "oldValue": "text",
        "requester": {
            "comments": "text",
            "name": "keyword",
            "type": "keyword"
        },
        "reviewer": {
            "comments": "text",
            "name": "keyword",
            "type": "keyword"
        },
        "sourceName": "text"
    },
    "created": "date",
    "description": "text",
    "hostname": "keyword",
```

```
    "id": "keyword",
    "ipAddress": "keyword",
    "requestId": "keyword",
    "stack": "keyword",
    "synced": "date", "target": {
      "name": "keyword",
      "type": "keyword"
    },
    "type": "text"
}
```

Sample

```
{
    "id": "1aecf630-1e99-4541-aa29-a4524df406c3",
    "action": "AUTHENTICATION-103",
    "type": "AUTH",
    "actor": {
     "name": "support",
     "type": null
    },
    "target": {
     "name": "support",
     "type": null
    },
    "created": "2018-07-12T20:57:56.872Z",
    "stack": "SSO",
    "requestId": null,
```

```
"hostname": "207.189.160.228",
"ipAddress": "207.189.160.228",
"description": null,
"attributes": { "sourceId": null,
  "sourceName": "DataStore"
},
"pod": "royale",
"org": "navigate",
"modified": null,
"synced": "2018-07-12T20:57:57.836Z"
}
```

Identity Document Model

```
"identity": {
    "@access": {
        "attribute": "text",
        "description": "text",
        "disabled": "Boolean",
        "displayName": "text",
        "id": "keyword",
        "name": "text",
        "owner": {
            "displayName": "text",
            "id": "keyword",
            "name": "text"
        },
        "privileged": "Boolean",
        "source": {
            "id": "keyword",
            "name": "text"
        },
        "standalone": "Boolean",
        "type": "keyword",
        "value": "text"
    },
    "@accounts": {
        "accountId": "text",
        "created": "date",
        "disabled": "Boolean",
        "entitlementAttributes": "object",
        "id": "keyword",
        "locked": "Boolean",
        "manuallyCorrelated":
        "Boolean", "name": "text",
```

```
    "passwordLastSet": "date",
    "privileged": "Boolean",
    "source": {
       "id": "keyword",
       "name": "text",
       "type": "keyword"
    }
 },
 "@apps": {
    "account": {
       "accountId": "text",
       "id": "keyword"
    },
    "id": "keyword",
    "name": "text",
    "source": {
       "id": "keyword",
       "name": "text"
    }
 },
 "@groups": {
    "id": "keyword",
    "name": "text"
 },
 "accessCount": "integer",
 "accessProfileCount": "integer",
 "accountCount": "integer",
 "appCount": "integer",
 "attributes": "dynamic object",
 "created": "date",
 "displayName": "text",
```

```
"email": "text",
"employeeNumber": "keyword",
"entitlementCount": "integer",
"firstName": "text",
"groupCount": "integer",
"id": "keyword",
"identityProfile": {
    "id": "keyword",
    "name": "text"
},
"inactive": "Boolean",
"isManager": "Boolean",
"lastModified": "date",
"lastName": "text",
"manager": {
    "displayName": "text",
    "id": "keyword",
    "name": "text"
},
"modified": "date",
"name": "text",
"phone": "keyword",
"processingDetails": {
    "date": "date",
    "message": "text",
    "retryCount": "integer",
    "stackTrace": "text",
    "stage": "keyword"
},
"processingState": "keyword",
"roleCount": "integer",
"source": {
```

```
      "id": "keyword",
      "name": "text"
    },
    "status": "keyword",
    "synced": "date"
}
```

Sample

```
{
    "id": "2c9180865c45e7e3015c46c434a80622",
    "name": "ad.admin",
    "displayName": "AD Admin",
    "firstName": "AD",
    "lastName": "Admin",
    "email": "SLPT.CLOUD.SAILPOINT.TEST+AD-ADMIN@GMAIL.COM",
    "phone": null,
    "created": 1495835882664,
    "modified": 1534899614297,
    "inactive": false,
    "status": "UNREGISTERED",
    "employeeNumber": null,
    "manager": null,
    "isManager": false,
    "source": {
      "name": "EndToEnd-ADSource", "id": "2c9180855c45b230015c46c19b9c0202"
    },
    "processingDetails": null,
    "processingState": null,
    "attributes": {
      "uid": "ad.admin",
      "firstname": "AD",
```

```
      "cloudAuthoritativeSource": "2c9180855c45b230015c46c19b9c0202",
      "cloudStatus": "UNREGISTERED",
      "iplanet-am-user-alias-list": null,
      "displayName": "AD Admin",
      "internalCloudStatus": "UNREGISTERED",
      "workPhone": "512-942-7578",
      "email": "SLPT.CLOUD.SAILPOINT.TEST+AD-ADMIN@GMAIL.COM",
      "lastname": "Admin"
    },
    "accounts": [
      {
        "id": "2c9180865c45e7e3015c46c434a80623",
        "name": "ad.admin",
        "accountId": "CN=AD Admin,OU=slpt-automation,DC=TestAutomationAD,DC=local",
        "source": {
          "name": "EndToEnd-ADSource",
          "id": "2c9180855c45b230015c46c19b9c0202",
          "type": "Active Directory - Direct"
        },
        "disabled": false,
        "locked": false,
        "privileged": false,
        "manuallyCorrelated": false,
        "passwordLastSet": 1451577767262,
        "entitlementAttributes": {
          "memberOf": [
            "CN=SpecificUsersFromSource-cloud.user,OU=Automation_Users,OU=slpt-automation,DC=TestAutomationAD,DC=local",
            "CN=TestProvisioningGroup1,OU=provisioningTests,OU=slpt-automation,DC=TestAutomationAD,DC=local",
            "CN=texas-sales,OU=Texas,OU=Americas,OU=slpt-automation-unused,DC=TestAutomationAD,DC=local",
```

"CN=texas-engineering,OU=Texas,OU=Americas,OU=slpt-automation-unused,DC=TestAutomationAD,DC=local", "CN=UnittestNoOneBelongsToThisGroup,OU=LauncherTestOrg,OU=slpt-automation,DC=TestAutomationAD,DC=local",
"CN=cloud support,OU=Automation_Users,OU=slpt-automation,DC=TestAutomationAD,DC=local",
"CN=cloud development,OU=Automation_Users,OU=slpt-automation,DC=TestAutomationAD,DC=local",
"CN=cloud testing,OU=Automation_Users,OU=slpt-automation,DC=TestAutomationAD,DC=local",
"CN=LauncherTestGroup3,OU=LauncherTestOrg,OU=slpt-automation,DC=TestAutomationAD,DC=local",
"CN=LauncherTestGroup2,OU=LauncherTestOrg,OU=slpt-automation,DC=TestAutomationAD,DC=local",
"CN=LauncherTestGroup1,OU=LauncherTestOrg,OU=slpt-automation,DC=TestAutomationAD,DC=local",
"CN=globb,OU=HierarchicalGroups,OU=slpt-automation- unused,DC=TestAutomationAD,DC=local",
"CN=globa,OU=HierarchicalGroups,OU=slpt-automation- unused,DC=TestAutomationAD,DC=local",
"CN=DistTierUniversal,OU=HierarchicalGroups,OU=slpt-automation- unused,DC=TestAutomationAD,DC=local",
"CN=DistTierGlobal,OU=HierarchicalGroups,OU=slpt-automation- unused,DC=TestAutomationAD,DC=local",
"CN=DistTier4,OU=HierarchicalGroups,OU=slpt-automation- unused,DC=TestAutomationAD,DC=local",
"CN=GoldEntitlement,OU=testRegion,OU=slpt-automation- unused,DC=TestAutomationAD,DC=local",
"CN=DiamondEntitlement,OU=testRegion,OU=slpt-automation- unused,DC=TestAutomationAD,DC=local",
"CN=Denied RODC Password Replication Group,CN=Users,DC=TestAutomationAD,DC=local", "CN=Group Policy Creator Owners,CN=Users,DC=TestAutomationAD,DC=local",
"CN=Domain Guests,CN=Users,DC=TestAutomationAD,DC=local",
"CN=Domain Admins,CN=Users,DC=TestAutomationAD,DC=local",
"CN=Enterprise Admins,CN=Users,DC=TestAutomationAD,DC=local",
"CN=Schema Admins,CN=Users,DC=TestAutomationAD,DC=local",
"CN=Guests,CN=Builtin,DC=TestAutomationAD,DC=local",
"CN=Administrators,CN=Builtin,DC=TestAutomationAD,DC=local"
]
},
"created": 1495835882664
},
{
"id": "2c918083606d670c01606f35a30a0349", "name": "ad.admin",
"accountId": "ad.admin",
"source": {
"name": "IdentityNow",
"id": "ff8081815c46b85b015c46b90c7c02a6", "type": "IdentityNowConnector"
},
"disabled": false,
"locked": false,
"privileged": false,
"manuallyCorrelated": false,
"passwordLastSet": null,
"entitlementAttribute

```
        s": {}, "created":
        1513694274314
      }
    ]
    ,
    "accountC
    ount": 2,
    "apps": [
      {
        "id": "22751",
        "name": "ADP
        Workforce Now",
        "source": {
          "name": "Corporate Active Directory",
          "id": "2c9180855c45b230015c46e2f6a8026a"
        },
        "account": {
          "id":
          "2c9180865c45efa4015c470be0de16
          06", "accountId": "CN=Barbara
Wilson,OU=Austin,OU=Americas,OU=Demo,DC=seri,DC=sailpointdemo,DC=com"
        }
      }
    ],
    "appC
    ount":
    1,
    "acces
    s": [
      {
        "privileged":
        false,
```

```
"attribute":
"memberOf",
"value":
"CN=Administrators,CN=Builtin,DC=TestAutomationAD,DC=local",
"source": {
  "name": "EndToEnd-ADSource",
  "id": "2c9180855c45b230015c46c19b9c0202"
}, "standalone": false,
"id":
"2c9180865c45e7e3015c46c457c507
55", "type": "ENTITLEMENT",
"name":
"Administrators",
"displayName":
"Administrators",
"description": null
},
{
  "owner": {
    "id":
    "2c9180865c45e7e3015c46c434a806
    22", "name": "ad.admin",
    "displayName": "AD Admin"
  },
  "source": {
    "name": "EndToEnd-ADSource",
    "id": "2c9180855c45b230015c46c19b9c0202"
  },
  "id":
  "2c918083634bc6cb01639808d40270
  ba", "type": "ACCESS_PROFILE",
```

```
    "name": "test [AccessProfile-
    1527264105448]", "displayName":
    "test",
    "description": "test"
  },
  {
    "disable
    d": false,
    "owner":
    {
      "id":
      "2c9180865c45e7e3015c46c5030707
      a0", "name": "will.albin",
      "displayName": "Albin Will"
    },
    "id":
    "2c9180865decdaa5015e06598b2931
    08", "type": "ROLE",
    "name": "test [cloudRole-
    1503345085223]", "displayName":
    "test",
    "description": "test"
  }
]
,
"accessCount":
3,
"entitlementCou
nt": 1,
"roleCount": 1,
"accessProfileC
ount": 1,
"identityProfile":
{
```

```
    "id": "2c918085605c8d0601606f357cb231e6",
    "name": "E2E AD"
  },
  "org":
  "navigate
  ", "pod":
  "royale",
  "synced": "2018-08-22T19:54:54.302Z"
 }
}
```

Role Document Model

```
"role": {
    "id":
    "keyword",
    "name":
    "text",
    "description
    ": "text",
    "modified": "date", // ISO
    8601 format "created":
    "date", // ISO 8601 format
    "enabled": "Boolean",
  "requestable": "Boolean",
  "@tags": {
                "id": "keyword"
                "name" : "text",
                "type": "TAG"
        },
    "accessProfiles: {
        "id": "keyword",
        "name": "keyword",
    },
    "accessProfileCount:
    "integer", "owner": {
        "id": "keyword",
        "name": "text"
    },
    "synced": "date"
}
```

Sample

```
{
    "id": "id",
    "name": "name",
    "description":
    "description",
    "modified": "2018-09-
    07T17:49:33.667Z", "created":
    "2018-09-07T17:49:33.667Z",
    "enabled": true,
"requestable": true,
"tags": [
    {
            "id": "2c9084ee5a8ad545345345a8de370110083"
            "name" : "SOD-SOX",
            "type": "TAG"
    },
    {
            "id": "2c9084ee5a8ad545345345a8de370122093"
            "name" : "PrivilegedAccess",
            "type": "TAG"
    },
]
    "accessPro
    files": [
      {
        "id": "accessProfileId",
        "name": "accessProfileName"
      }
    ],
    "accessProfileC
    ount": 1,
    "owner": {
```

```
        "name": "displayName",
        "id": "ownerId"
    },
    "synced": "2018-09-07T17:49:33.667Z"
}
```

MAPPING EXAMPLES

Access Profile Mapping

```
{
        "settings": {
                "index": {
                }
        },
        "mappings": {
                "_default_": {
                        "dynamic_templates": [
                                {
                                        "strings": {
                                                "match_mapping_type": "string",
                                                "mapping": {
                                                        "type": "text",
                                                        "fields": {
                                                                "exact": {
                                                                        "type": "keyword",
                                                                        "ignore_above": 256
                                                                }
                                                        }
                                                }
                                        }
                                }
                        ]
                },
                "accessprofile": {
                        "_meta": {
                                "version": "1.0"
                        },
                        "_all": {
                                "enabled": true
                        },
```

```
"dynamic": false,
"properties": {
        "org": {
                "type": "keyword"
        },
        "pod": {
                "type": "keyword"
        },
        "modified": {
                "type": "date",
                "format": "strict_date_optional_time||epoch_millis"
        },
        "created": {
                "type": "date",
                "format": "strict_date_optional_time||epoch_millis"
        },
        "synced": {
                "type": "date",
                "format": "strict_date_optional_time||epoch_millis"
        },
        "id": {
                "type": "keyword"
        },
        "name": {
                "type": "text",
                "fields": {
                        "exact": {
                                "type": "keyword"
                        }
                }
        },
        "description": {
                "type": "text",
                "fields": {
                        "exact": {
                                "type": "keyword"
```

```
                    }
                }
        },
        "requestable": {
                "type": "Boolean"
        },
        "owner": {
                "type": "object",
                "dynamic": false,
                "properties": {
                        "id": {
                                "type": "keyword"
                        },
                        "name": {
                                "type": "text",
                                "fields": {
                                        "exact": {
                                                "type": "keyword"
                                        }
                                }
                        }
                }
        },
        "source": {
                "type": "object",
                "dynamic": false,
                "properties": {
                        "id": {
                                "type": "keyword"
                        },
                        "name": {
                                "type": "text",
                                "fields": {
                                        "exact": {
```

```
                                    "type":
"keyword"
                                            }
                                        }
                                    }
                                }
                            },
                            "entitlements": {
                                "type": "nested",
                                "dynamic": false,
                                "properties": {
                                    "id": {
                                        "type": "keyword"
                                    },
                                    "name": {
                                        "type": "text",
                                        "fields": {
                                            "keyword": {
                                                "type":
"keyword"
                                            }
                                        }
                                    },
                                    "description": {
                                        "type": "text",
                                        "fields": {
                                            "keyword": {
                                                "type":
"keyword"
                                            }
                                        }
                                    },
                                    "attribute": {
                                        "type": "text",
                                        "fields": {
                                            "keyword": {
```

```
                                        "type":
"keyword"
                                                    }
                                                }
                                            },
                                            "value": {
                                                "type": "text",
                                                "fields": {
                                                    "keyword": {
                                                        "type":
"keyword"
                                                    }
                                                }
                                            }
                                        }
                                    },
                                    "entitlementCount": {
                                        "type": "integer"
                                    }
                                }
                            }
                        }
                    }
```

Account Activities Mapping
```
{
    "settings": {
        "index": {
        },
        "analysis": {
            "normalizer": {
                "caseinsensitive_normalizer": {
                    "type": "custom",
                    "filter": [
                        "lowercase"
```

```
                                    ]
                                }
                            }
                        }
                    },
                    "mappings": {
                        "_default_": {
                            "dynamic_templates": [
                                {
                                    "strings": {
                                        "match_mapping_type": "string",
                                        "mapping": {
                                            "type": "text",
                                            "fields": {
                                                "exact": {
                                                    "type": "keyword"
                                                }
                                            }
                                        }
                                    }
                                }
                            ]
                        },
                        "accountactivity": {
                            "dynamic": false,
                            "_all": {
                                "enabled": true
                            },
                            "_meta": {
                                "version": "1.0"
                            },
                            "properties": {
                                "org": {
                                    "type": "keyword",
                                    "include_in_all": false
```

```
        },
        "pod": {
                "type": "keyword",
                "include_in_all": false
        },
        "id": {
                "type": "keyword"
        },
        "name": {
                "type": "text",
                "fields": {
                        "exact": {
                                "type": "keyword"
                        }
                }
        },
        "type": {
                "type": "text",
                "fields": {
                        "exact": {
                                "type": "keyword"
                        }
                }
        },
        "created": {
                "type": "date"
        },
        "modified": {
                "type": "date"
        },
        "completion": {
                "type": "keyword",
                "normalizer": "caseinsensitive_normalizer"
        },
        "origin": {
                "type": "text",
```

```
                    "fields": {
                            "exact": {
                                    "type": "keyword",
                                    "ignore_above": 256
                            }
                    }
            },
            "status": {
                    "type": "keyword",
                    "normalizer": "caseinsensitive_normalizer"
            },
            "requester": {
                    "properties": {
                            "id": {
                                    "type": "keyword"
                            },
                            "name": {
                                    "type": "text",
                                    "fields": {
                                            "exact": {
                                                    "type": "keyword",
                                                    "ignore_above": 256
                                            }
                                    }
                            },
                            "type": {
                                    "type": "keyword"
                            }
                    }
            },
            "target": {
                    "properties": {
                            "id": {
                                    "type": "keyword"
```

```
                },
                "name": {
                    "type": "text",
                    "fields": {
                        "exact": {
                            "type": "keyword",
                            "ignore_above": 256
                        }
                    }
                },
                "type": {
                    "type": "keyword"
                }
            }
        },
        "trackingId" : {
            "type": "keyword"
        },
        "errors": {
            "type": "text",
            "fields": {
                "exact": {
                    "type": "keyword",
                    "ignore_above": 256
                }
            }
        },
        "warnings": {
            "type": "text",
            "fields": {
                "exact": {
                    "type": "keyword",
                    "ignore_above": 256
                }
```

```
                    }
                },
                "approvals": {
                    "type": "object",
                    "properties": {
                        "comments": {
                            "type": "object",
                            "properties": {
                                "comment" : {
                                    "type":"text",
                                    "fields": {
                                        "exact": {
                                            "type": "keyword",
                                            "ignore_above": 256
                                        }
                                    }
                                },
                                "commenter" : {
                                    "type":"keyword"
                                },
                                "date" :{
                                    "type":"date"
                                }
                            }
                        },
                        "created": {
                            "type": "date"
                        },
                        "modified": {
                            "type": "date"
                        },
                        "owner": {
```

```
                                                "properties": {
                                                        "id": {
                                                                "type": "keyword"
                                                        },
                                                        "name": {
                                                                "type": "text",
                                                                "fields": {
                                                                        "exact": {
                                                                                "type": "keyword",
                                                                                "ignore_above": 256
                                                                        }
                                                                }
                                                        },
                                                        "type": {
                                                                "type": "keyword"
                                                        }
                                                },
                                                "result": {
                                                        "type": "keyword",
                                                        "normalizer": "caseinsensitive_normalizer"
                                                },
                                                "type": {
                                                        "type": "keyword",
                                                        "normalizer": "caseinsensitive_normalizer"
                                                }
                                        }
                                },
```

```
"originalRequest": {
    "type": "object",
    "properties": {
        "accountId": {
            "type": "text",
            "fields": {
                "exact": {
                    "type": "keyword",
                    "ignore_above": 256
                }
            }
        },
        "attributeRequests": {
            "properties": {
                "name": {
                    "type": "text",
                    "fields": {
                        "exact": {
                            "type": "keyword",
                            "ignore_above": 256
                        }
                    }
                },
                "op": {
                    "type": "keyword",
                    "normalizer": "caseinsensitive_normalizer"
                },
                "value": {
```

```
                "type": "text",
                "fields": {
                    "exact": {
                        "type": "keyword",
                        "ignore_above": 256
                    }
                }
            },
            "op": {
                "type": "keyword",
                "normalizer": "caseinsensitive_normalizer"
            },
            "source": {
                "properties": {
                    "id": {
                        "type": "keyword"
                    },
                    "name": {
                        "type": "text",
                        "fields": {
                            "exact": {
                                "type": "keyword",
                                "ignore_above": 256
                            }
                        }
                    }
```

```
                                        },
                                        "type": {
                                                "type":
"text",
                                                "fields": {
        "exact": {
                "type": "keyword",
                "ignore_above": 256
                                                                }
                                                        }
                                                }
                                        }
                                }
                        }
                },
                "expansionItems": {
                        "dynamic":false,
                        "properties": {
                                "accountId": {
                                        "type": "text",
                                        "fields": {
                                                "exact": {
                                                        "type":
"keyword",
                "ignore_above": 256
                                                }
                                        }
                                },
                                "cause": {
                                        "type": "keyword",
```

```
"caseinsensitive_normalizer"

"keyword",

"ignore_above": 256

"exact": {

"type": "keyword",

"ignore_above": 256

"keyword",

"normalizer": "caseinsensitive_normalizer"
```

```
                        "normalizer":
                },
                "name" : {
                        "type": "text",
                        "fields": {
                                "exact": {
                                        "type":
                                                                "keyword", }
                        }
                },
                "attributeRequest" : {
                        "properties": {
                                "name": {
                                        "type":
                                                                "text", "fields": {

}
                                        }
                                },
                                "op": {
                                        "type":
                                                                "keyword", },
                                "value": {
```

```
                                                        "type":
"text",
                                                        "fields": {

"exact": {

"type": "keyword",

"ignore_above": 256
                                                                    }
                                                                }
                                                            }
                                                        }
                                                    },
                                                    "source" :{
                                                        "properties": {
                                                            "id": {
                                                                "type":
"keyword"
                                                            },
                                                            "name": {
                                                                "type":
"text",
                                                                "fields": {

"exact": {

"type": "keyword",

"ignore_above": 256
                                                                    }
                                                                }
                                                            },
                                                            "type": {
                                                                "type":
"text",
```

```
                                "exact": {
                                    "type": "keyword",
                                    "ignore_above": 256
                                }
                            }
                        }
                    }
                }
            }
        }
    },
    "accountRequests": {
        "type":"nested",
        "dynamic": false,
        "properties": {
            "accountId": {
                "type": "text",
                "fields": {
                    "exact": {
                        "type": "keyword",
                        "ignore_above": 256
                    }
                }
            },
            "attributeRequests": {
                "properties": {
                    "name": {
                        "type": "text",
                        "fields": {
```

```
                "exact": {
                    "type": "keyword",
                    "ignore_above": 256
                }
            }
        },
        "op": {
            "type": "keyword",
            "normalizer": "caseinsensitive_normalizer"
        },
        "value": {
            "type": "text",
            "fields": {
                "exact": {
                    "type": "keyword",
                    "ignore_above": 256
                }
            }
        }
    },
    "op": {
        "type": "keyword",
        "normalizer": "caseinsensitive_normalizer"
    },
    "provisioningTarget": {
```

```
                                "keyword"

"text",

"exact": {

"type": "keyword",

"ignore_above": 256

"text",

"exact": {

"type": "keyword",

"ignore_above": 256
```

```
                    "properties": {
                            "id": {
                                    "type":
                            },
                            "name": {
                                    "type":
                                    "fields": {

}
                                    }
                            },
                            "type": {
                                    "type":
                                    "fields": {

}
                                            }
                                    }
                            }
                    },
                    "result": {
                            "type": "object",
                            "dynamic": true,
```

```
                    "text",
                            "exact": {
                                "type": "keyword",
                                "ignore_above": 256

"keyword",
                        "normalizer": "caseinsensitive_normalizer"

"keyword"

"keyword"

"text",
```

```
                                        "properties": {
                                            "errors": {
                                                "type": "text",
                                                "fields": {

}
                                            }
                                        },
                                        "status": {
                                            "type": "keyword", },
                                        "ticketId": {
                                            "type": "keyword"

}
                                        }
                                    },
                                    "source": {
                                        "properties": {
                                            "id": {
                                                "type": "keyword"

},
                                            "name": {
                                                "type": "text",
                                                "fields": {
```

```
                "exact": {

"type": "keyword",

"ignore_above": 256

}

}

},

"type": {

"type": "text",

"exact": {

"fields": {

"type": "keyword",

"ignore_above": 256

}

}

}

}
            },
            "sourceSummary" : {
                    "type": "keyword"
            }
                }
            }
        }
}
```

Entitlement Mapping

```
{
    "settings": {
        "index": {
        }
    },
    "mappings": {
        "_default_": {
            "dynamic_templates": [
                {
                    "strings": {
                        "match_mapping_type": "string",
                        "mapping": {
                            "type": "text",
                            "fields": {
                                "exact": {
                                    "type": "keyword",
                                    "ignore_above": 256
                                }
                            }
                        }
                    }
                }
            ]
        },
        "entitlement": {
            "_meta": {
                "version": "2.0"
            },
            "_all": {
                "enabled": true
            },
            "dynamic": false,
            "properties": {
                "org": {
```

```
                "type": "keyword"
        },
        "pod": {
                "type": "keyword"
        },
        "modified": {
                "type": "date",
                "format": "strict_date_optional_time||epoch_millis"
        },
        "synced": {
                "type": "date",
                "format": "strict_date_optional_time||epoch_millis"
        },
        "id": {
                "type": "keyword"
        },
        "displayName": {
                "type": "text",
                "fields": {
                        "exact": {
                                "type": "keyword"
                        }
                }
        },
        "name": {
                "type": "text",
                "fields": {
                        "exact": {
                                "type": "keyword"
                        }
                }
        },
        "description": {
                "type": "text",
                "fields": {
                        "exact": {
```

```
                                        "type": "keyword"
                                    }
                                }
                            },
                            "source": {
                                "type": "object",
                                "dynamic": false,
                                "properties": {
                                    "id": {
                                        "type": "keyword"
                                    },
                                    "name": {
                                        "type": "text",
                                        "fields": {
                                            "exact": {
                                                "type": "keyword"
                                            }
                                        }
                                    }
                                }
                            },
                            "privileged": {
                                "type": "Boolean"
                            },
                            "attribute": {
                                "type": "text",
                                "fields": {
                                    "exact": {
                                        "type": "keyword"
                                    }
                                }
                            },
                            "value": {
                                "type": "text",
                                "fields": {
```

```
                                        "exact": {
                                                "type": "keyword"
                                        }
                                }
                        },
                        "identityCount": {
                                "type": "integer"
                        }
                }
        }
}

Identitiy Mapping
{
        "settings": {
                "index": {
                }
        },
        "mappings": {
                "_default_": {

},
                "identity": {
                        "_meta": {
                                "version": "3.0"
                        },
                        "_all": {
                                "enabled": true
                        },
                        "dynamic": false,
                        "date_detection": false,
                        "dynamic_templates": [
                                {
                                        "date_fields": {
```

```
                                        "match_pattern": "regex",
                                        "path_match":
"attributes\\.(endDate|startDate)",
                                        "mapping": {
                                                "type": "date",
                                                "format":
"date_optional_time||epoch_millis||yyyy/MM/dd HH:mm:ss Z||yyyy/MM/dd Z||yyyy/MM/dd",
                                                "ignore_malformed": true,
                                                "fields": {
                                                        "exact": {
                                                                "type":
"keyword"
                                                        }
                                                }
                                        }
                                }
                        },
                        {
                                "prefixed_date_fields": {
                                        "match_pattern":"regex",
                                        "path_match":
"attributes\\.(.)*[dD]ate[tT]ype",
                                        "mapping": {
                                                "type": "date",
                                                "format":
"date_optional_time||epoch_millis||yyyy/MM/dd HH:mm:ss Z||yyyy/MM/dd Z||yyyy/MM/dd",
                                                "ignore_malformed": true,
                                                "fields": {
                                                        "exact": {
                                                                "type":
"keyword"
                                                        }
                                                }
                                        }
                                }
                        },
```

```
{
    "strings": {
        "match_mapping_type": "string",
        "mapping": {
            "type": "text",
            "fields": {
                "exact": {
                    "type": "keyword",
                    "ignore_above": 256
                }
            }
        }
    }
}
],
"numeric_detection": false,
"properties": {
    "org": {
        "type": "keyword",
        "include_in_all": false
    },
    "pod": {
        "type": "keyword",
        "include_in_all": false
    },
    "name": {
        "type": "text",
        "fields": {
            "exact": {
                "type": "keyword"
            }
        }
    },
    "firstName": {
```

```
                    "type": "text",
                    "fields": {
                            "exact": {
                                    "type": "keyword"
                            }
                    }
            },
            "lastName": {
                    "type": "text",
                    "fields": {
                            "exact": {
                                    "type": "keyword"
                            }
                    }
            },
            "displayName": {
                    "type": "text",
                    "fields": {
                            "exact": {
                                    "type": "keyword"
                            }
                    }
            },
            "email": {
                    "type": "keyword"
            },
            "id": {
                    "type": "keyword"
            },
            "created": {
                    "type": "date",
                    "format": "strict_date_optional_time||epoch_millis"
            },
            "modified": {
                    "type": "date",
                    "format": "strict_date_optional_time||epoch_millis"
```

```
        },
        "synced": {
                "type": "date",
                "format": "strict_date_optional_time||epoch_millis"
        },
        "phone": {
                "type": "keyword"
        },
        "inactive": {
                "type": "Boolean"
        },
        "protected": {
                "type": "Boolean"
        },
        "status": {
                "type": "keyword"
        },
        "employeeNumber": {
                "type": "keyword"
        },
        "manager": {
                "type": "object",
                "dynamic": false,
                "properties": {
                        "id": {
                                "type": "keyword"
                        },
                        "name": {
                                "type": "text",
                                "fields": {
                                        "exact": {
                                                "type": "keyword"
                                        }
                                }
                        },
```

```
                    "displayName": {
                        "type": "text",
                        "fields": {
                            "exact": {
                                "type": "keyword"
                            }
                        }
                    }
                },
                "isManager": {
                    "type": "Boolean"
                },
                "identityProfile": {
                    "type": "object",
                    "dynamic": false,
                    "properties": {
                        "id": {
                            "type": "keyword"
                        },
                        "name": {
                            "type": "text",
                            "fields": {
                                "exact": {
                                    "type": "keyword"
                                }
                            }
                        }
                    }
                },
                "source": {
                    "type": "object",
                    "dynamic": false,
                    "properties": {
```

```
                    "id": {
                            "type": "keyword"
                    },
                    "name": {
                            "type": "text",
                            "fields": {
                                    "exact": {
                                            "type": "keyword"
                                    }
                            }
                    }
            },
            "attributes": {
                    "type": "object",
                    "dynamic": true
            },
            "processingState": {
                    "type": "keyword"
            },
            "processingDetails": {
                    "type": "object",
                    "dynamic": false,
                    "properties": {
                            "date": {
                                    "type": "date",
                                    "format": "strict_date_optional_time||epoch_millis"
                            },
                            "stage": {
                                    "type": "keyword"
                            },
                            "retryCount": {
                                    "type": "integer"
                            },
```

```
                    "stackTrace": {
                            "type": "text"
                    },
                    "message": {
                            "type": "text"
                    }
            }
    },
    "accounts": {
            "type": "nested",
            "dynamic": false,
            "properties": {
                    "id": {
                            "type": "keyword"
                    },
                    "name": {
                            "type": "text",
                            "fields": {
                                    "exact": {
                                            "type": "keyword"
                                    }
                            }
                    },
                    "accountId": {
                            "type": "text",
                            "fields": {
                                    "exact": {
                                            "type": "keyword"
                                    }
                            }
                    },
                    "source": {
                            "type": "object",
                            "dynamic": false,
```

```
                                        "keyword"
                                                                        "properties": {
                                                                                "id": {
                                                                                        "type":
"keyword"
                                                                                },
                                                                                "name": {
                                                                                        "type":
"text",
                                                                                        "fields": {
                        "exact": {
                                "type": "keyword"
                                                                                                }
                                                                                        }
                                                                                },
                                                                                "type": {
                                                                                        "type":
"keyword"
                                                                                }
                                                                        }
                                                                },
                                                                "disabled": {
                                                                        "type": "Boolean"
                                                                },
                                                                "locked": {
                                                                        "type": "Boolean"
                                                                },
                                                                "privileged": {
                                                                        "type": "Boolean"
                                                                },
                                                                "manuallyCorrelated": {
                                                                        "type": "Boolean"
                                                                },
                                                                "passwordLastSet": {
                                                                        "type": "date",
```

```
                                        "format":
"strict_date_optional_time||epoch_millis"
                                        },
                                        "entitlementAttributes": {
                                                "type": "object",
                                                "dynamic": true
                                        },
                                        "created": {
                                                "type": "date",
                                                "format":
"strict_date_optional_time||epoch_millis"
                                        }
                                }
                        },
                        "accountCount": {
                                "type": "integer"
                        },
                        "apps": {
                                "type": "nested",
                                "dynamic": false,
                                "properties": {
                                        "id": {
                                                "type": "keyword"
                                        },
                                        "name": {
                                                "type": "text",
                                                "fields": {
                                                        "exact": {
                                                                "type":
"keyword"
                                                        }
                                                }
                                        },
                                        "source": {
                                                "type": "object",
                                                "dynamic": false,
```

```
                                        "properties": {
                                                "id": {
                                                        "type": "keyword"
                                                },
                                                "name": {
                                                        "type": "text",
                                                        "fields": {
                                                                "exact": {
                                                                        "type": "keyword"
                                                                }
                                                        }
                                                }
                                        }
                                },
                                "account": {
                                        "type": "object",
                                        "dynamic": false,
                                        "properties": {
                                                "id": {
                                                        "type": "keyword"
                                                },
                                                "accountId": {
                                                        "type": "text",
                                                        "fields": {
                                                                "exact": {
                                                                        "type": "keyword"
                                                                }
                                                        }
                                                }
                                        }
                                }
```

```
                    }
                   }
                  }
                 }
                },
                "appCount": {
                 "type": "integer"
                },
                "access": {
                 "type": "nested",
                 "dynamic": false,
                 "properties": {
                  "id": {
                   "type": "keyword"
                  },
                  "type": {
                   "type": "keyword"
                  },
                  "displayName": {
                   "type": "text",
                   "fields": {
                    "exact": {
                     "type": "keyword"
                    }
                   }
                  },
                  "name": {
                   "type": "text",
                   "fields": {
                    "exact": {
                     "type": "keyword"
                    }
                   }
                  },
```

```
                                                "description": {
                                                        "type": "text",
                                                        "fields": {
                                                                "exact": {
                                                                        "type":
"keyword"
                                                                }
                                                        }
                                                },
                                                "source": {
                                                        "type": "object",
                                                        "dynamic": false,
                                                        "properties": {
                                                                "id": {
                                                                        "type":
"keyword"
                                                                },
                                                                "name": {
                                                                        "type":
"text",
                                                                        "fields": {
                                                                                "exact": {
                                                                                        "type": "keyword"
                                                                                }
                                                                        }
                                                                }
                                                        }
                                                },
                                                "owner": {
                                                        "type": "object",
                                                        "dynamic": false,
                                                        "include_in_all": false,
                                                        "properties": {
                                                                "id": {
```

```
                                "keyword"

"text",

"exact": {

"type": "keyword"

"text",

"exact": {

"type": "keyword"

"keyword"
```

```
                                                "type":
                                        },
                                        "name": {
                                                "type":
                                                "fields": {

}
                                                }
                                        },
                                        "displayName": {
                                                "type":
                                                "fields": {

}
                                                }
                                        }
                                },
                                "privileged": {
                                        "type": "Boolean"
                                },
                                "attribute": {
                                        "type": "text",
                                        "fields": {
                                                "exact": {
                                                        "type":
```

```
                                }
                            }
                        },
                        "value": {
                            "type": "text",
                            "fields": {
                                "exact": {
                                    "type": "keyword"
                                }
                            }
                        },
                        "disabled": {
                            "type": "Boolean"
                        },
                        "standalone": {
                            "type": "Boolean"
                        }
                    }
                },
                "accessCount": {
                    "type": "integer"
                },
                "entitlementCount": {
                    "type": "integer"
                },
                "roleCount": {
                    "type": "integer"
                },
                "accessProfileCount": {
                    "type": "integer"
                },
                "owns": {
                    "type": "object",
                    "dynamic": false,
                    "properties": {
```

```
                                                    "sources": {
                                                        "type": "object",
                                                        "dynamic": false,
                                                        "properties": {
                                                            "id": {
                                                                "type": "keyword"
                                                            },
                                                            "name": {
                                                                "type": "text",
                                                                "fields": {
                                                                    "exact": {
                                                                        "type": "keyword"
                                                                    }
                                                                }
                                                            }
                                                        }
                                                    },
                                                    "entitlements": {
                                                        "type": "object",
                                                        "dynamic": false,
                                                        "properties": {
                                                            "id": {
                                                                "type": "keyword"
                                                            },
                                                            "name": {
                                                                "type": "text",
                                                                "fields": {
                                                                    "exact": {
```

```
                        "type": "keyword"
                                                                    }
                                                                }
                                                            }
                                                        }
                                                    },
                                                    "accessProfiles": {
                                                        "type": "object",
                                                        "dynamic": false,
                                                        "properties": {
                                                            "id": {
                                                                "type": "keyword"
                                                            },
                                                            "name": {
                                                                "type": "text",
                                                                "fields": {
                                                                    "exact": {
                                                                        "type": "keyword"
                                                                    }
                                                                }
                                                            }
                                                        }
                                                    },
                                                    "roles": {
                                                        "type": "object",
                                                        "dynamic": false,
                                                        "properties": {
                                                            "id": {
                                                                "type": "keyword"
                                                            },
```

```
                                                "name": {
                                                        "type":
"text",
                                                        "fields": {
                "exact": {
                        "type": "keyword"
                                                                }
                                                        }
                                                }
                                        }
                                },
                                "apps": {
                                        "type": "object",
                                        "dynamic": false,
                                        "properties": {
                                                "id": {
                                                        "type":
"keyword"
                                                },
                                                "name": {
                                                        "type":
"text",
                                                        "fields": {
                "exact": {
                        "type": "keyword"
                                                                }
                                                        }
                                                }
                                        }
                                },
                                "governanceGroups": {
                                        "type": "object",
```

```
                                "keyword"
                    "text",
                        "exact": {
                            "type": "keyword"
                                        }
                                    }
                                }
                            }
                        }
                    }
                }
            }
        }
    }
}

Roles Mapping
{
    "settings": {
        "index": {
        }
    },
```

```
                    "dynamic": false,
                    "properties": {
                        "id": {
                            "type": "keyword"
                        },
                        "name": {
                            "type": "text",
                            "fields": {
                                "exact": {
                                    "type": "keyword"
                                }
                            }
                        },
                        "fallbackApprover": {
                            "type": "Boolean"
                        }
                    }
```

```
"mappings": {
    "_default_": {
        "dynamic_templates": [
            {
                "strings": {
                    "match_mapping_type": "string",
                    "mapping": {
                        "type": "text",
                        "fields": {
                            "exact": {
                                "type": "keyword",
                                "ignore_above": 256
                            }
                        }
                    }
                }
            }
        ]
    },
    "role": {
        "_meta": {
            "version": "1.0"
        },
        "_all": {
            "enabled": true
        },
        "dynamic": false,
        "properties": {
            "org": {
                "type": "keyword"
            },
            "pod": {
                "type": "keyword"
            },
```

```
"modified": {
        "type": "date",
        "format": "strict_date_optional_time||epoch_millis"
},
"created": {
        "type": "date",
        "format": "strict_date_optional_time||epoch_millis"
},
"synced": {
        "type": "date",
        "format": "strict_date_optional_time||epoch_millis"
},
"id": {
        "type": "keyword"
},
"name": {
        "type": "text",
        "fields": {
                "exact": {
                        "type": "keyword"
                }
        }
},
"description": {
        "type": "text",
        "fields": {
                "exact": {
                        "type": "keyword"
                }
        }
},
"enabled": {
        "type": "Boolean"
},
"requestable": {
        "type": "Boolean"
```

```
                },
                "owner": {
                        "type": "object",
                        "dynamic": false,
                        "properties": {
                                "id": {
                                        "type": "keyword"
                                },
                                "name": {
                                        "type": "text",
                                        "fields": {
                                                "exact": {
                                                        "type": "keyword"
                                                }
                                        }
                                }
                        }
                },
                "accessProfiles": {
                        "type": "object",
                        "dynamic": false,
                        "properties": {
                                "id": {
                                        "type": "keyword"
                                },
                                "name": {
                                        "type": "text",
                                        "fields": {
                                                "exact": {
                                                        "type": "keyword"
                                                }
                                        }
                                }
                        }
                }
```

```
                },
                "accessProfileCount": {
                        "type": "integer"
                }
            }
        }
    }
}
```

What is claimed is:

1. An identity management system, comprising:
   a processor;
   a non-transitory, computer-readable storage medium, including computer instructions for:
   an sync pipeline for:
   obtaining identity management data associated with one or more source systems in a distributed enterprise computing environment, the identity management data comprising data on a set of identity management artifacts utilized in identity management in the distributed enterprise computing environment, wherein the identity management artifacts include a first identity management artifact of a first type and a second identity management artifact of a second type; and
   determining that the first identity management artifact of the first type is associated with the second identity management artifact of the second type; and
   communicating with a search service to index the identity management artifacts in the search index, including to index the first identity management artifact as a first document in the search index, to index the second identity management artifact as a second document in the search index, and to index the second identity management artifact as a nested document of the first identity management artifact;
   a search service for:
   maintaining a search index for the identity management artifacts, the search index comprising a document for each of the identity management artifacts; and
   communicating with the sync pipeline to index the first identity management artifact as the first document in the search index by creating the first document in the search index, to index the second identity management artifact as the second document in the search index by creating the second document in the search index and to index the second identity management artifact as a nested document of the first identity management artifact by including the second document for the second identity management artifact in the first document for the first identity management artifact in the search index while separately maintaining the second document for the second identity management artifact in the search index, thereby allowing the search service to search the first identity management artifact in the search index based on the second identity management artifact by accessing the first identity management document for the first identity management artifact.

2. The system of claim 1, wherein the search service is adapted to search receive a query in a query syntax that includes a nested query identifier specifying that a second type of the second identity management artifact is the nested document.

3. The system of claim 2, wherein the first identity management artifacts is of a first type and the search service searches only documents for the first type of identity management artifacts based on the specification that the second type of the second identity manager artifact is the nested document.

4. The system of claim 1, wherein the first type of the first identity management artifact is an identity and the second type of the second identity management artifact is an account or an access.

5. The system of claim 1, wherein the search index is maintained in a NoSQL data store.

6. The system of claim 5, wherein the search index converts the query in the query syntax including the nested query identifier to a native query syntax of the search index.

7. The system of claim 1, wherein the identity management artifacts comprise an identity, entitlement, application, account, role, event, policy, group, permission, user, owner, source, configuration, organization, violation, governance group, access profile or account activity.

8. A method for searching identity management artifacts, comprising:
   in a sync pipeline:
   obtaining identity management data associated with one or more source systems in a distributed enterprise computing environment, the identity management data comprising data on a set of identity management artifacts utilized in identity management in the distributed enterprise computing environment, wherein the identity management artifacts include a first identity management artifact of a first type and a second identity management artifact of a second type;
   determining that the first identity management artifact of the first type is associated with the second identity management artifact of the second type; and
   communicating with a search service to index the identity management artifacts in the search index, including to index the first identity management artifact as a first document in the search index, to index the second identity management artifact as a second document in the search index, and to index the second identity management artifact as a nested document of the first identity management artifact; and
   at a search service:
   maintaining a search index for the identity management artifacts, the search index comprising a document for each of the identity management artifacts; and
   communicating with the sync pipeline to index the first identity management artifact as the first document in the search index by creating the first document in the search index, to index the second identity management artifact as the second document in the search index by creating the second document in the search index and to index the second identity management artifact as a nested document of the first identity management artifact by including the second document for the second identity management artifact in the first document for the first identity management artifact in the search index while separately maintaining the second document for the second identity management artifact in the search index, thereby allowing the search service to search the first identity management artifact in the search index based on the second identity management artifact by accessing the first identity management document for the first identity management artifact.

9. The method of claim 8, wherein the search service is adapted to search receive a query in a query syntax that includes a nested query identifier specifying that a second type of the second identity management artifact is the nested document.

10. The method of claim 9, wherein the first identity management artifacts is of a first type and the search service searches only documents for the first type of identity management artifacts based on the specification that the second type of the second identity manager artifact is the nested document.

11. The method of claim 8, wherein the first type of the first identity management artifact is an identity and the second type of the second identity management artifact is an account or an access.

12. The method of claim 8, wherein the search index is maintained in a NoSQL data store.

13. The method of claim 12, wherein the search index converts the query in the query syntax including the nested query identifier to a native query syntax of the search index.

14. The method of claim 8, wherein the identity management artifacts comprise an identity, entitlement, application, account, role, event, policy, group, permission, user, owner, source, configuration, organization, violation, governance group, access profile or account activity.

15. A non-transitory computer readable medium, comprising instructions for:

in a sync pipeline:
obtaining identity management data associated with one or more source systems in a distributed enterprise computing environment, the identity management data comprising data on a set of identity management artifacts utilized in identity management in the distributed enterprise computing environment, wherein the identity management artifacts include a first identity management artifact of a first type and a second identity management artifact of a second type;
determining that the first identity management artifact of the first type is associated with the second identity management artifact of the second type; and
communicating with a search service to index the identity management artifacts in the search index, including to index the first identity management artifact as a first document in the search index, to index the second identity management artifact as a second document in the search index, and to index the second identity management artifact as a nested document of the first identity management artifact; and at a search service:
maintaining a search index for the identity management artifacts, the search index comprising a document for each of the identity management artifacts; and
communicating with the sync pipeline to index the first identity management artifact as the first document in the search index by creating the first document in the search index, to index the second identity management artifact as the second document in the search index by creating the second document in the search index and to index the second identity management artifact as a nested document of the first identity management artifact by including the second document for the second identity management artifact in the first document for the first identity management artifact in the search index while separately maintaining the second document for the second identity management artifact in the search index, thereby allowing the search service to search the first identity management artifact in the search index based on the second identity management artifact by accessing the first identity management document for the first identity management artifact.

16. The non-transitory computer readable medium of claim 15, wherein the search service is adapted to search receive a query in a query syntax that includes a nested query identifier specifying that a second type of the second identity management artifact is the nested document.

17. The non-transitory computer readable medium of claim 16, wherein the first identity management artifacts is of a first type and the search service searches only documents for the first type of identity management artifacts based on the specification that the second type of the second identity manager artifact is the nested document.

18. The non-transitory computer readable medium of claim 15, wherein the first type of the first identity management artifact is an identity and the second type of the second identity management artifact is an account or an access.

19. The non-transitory computer readable medium of claim 15, wherein the search index is maintained in a NoSQL data store.

20. The non-transitory computer readable medium of claim 19, wherein the search index converts the query in the query syntax including the nested query identifier to a native query syntax of the search index.

21. The non-transitory computer readable medium of claim 15, wherein the identity management artifacts comprise an identity, entitlement, application, account, role, event, policy, group, permission, user, owner, source, configuration, organization, violation, governance group, access profile or account activity.

* * * * *